United States Patent [19]

Champlin et al.

[11] Patent Number: 4,486,852
[45] Date of Patent: Dec. 4, 1984

[54] SYNCHRONOUS TIME-SHARED DATA BUS SYSTEM

[75] Inventors: Keith S. Champlin, Minneapolis; Ernest C. Preimesberger, Coon Rapids; Larry A. Meyer, Spring Lake; George W. Miller, Anoka, all of Minn.

[73] Assignee: FMC Corporation, Chicago, Ill.

[21] Appl. No.: 45,799

[22] Filed: Jun. 5, 1979

Related U.S. Application Data

[63] Continuation-in-part of Ser. No. 912,780, Jun. 5, 1978, abandoned.

[51] Int. Cl.³ .............................. H04J 3/00; H04J 3/08
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,312,954 | 4/1967 | Bible et al. | 364/200 |
| 3,544,976 | 12/1970 | Collins | 364/200 |
| 3,632,881 | 1/1972 | Graham | 370/89 |
| 3,633,169 | 1/1972 | Bickford | 364/200 |
| 3,639,694 | 2/1972 | Deutsch et al. | 350/84 |
| 3,639,904 | 2/1972 | Arulpragasam | 16/318 |
| 3,659,271 | 4/1972 | Collins et al. | 364/200 |
| 3,697,959 | 10/1972 | Abramson et al. | 364/200 |
| 3,879,582 | 4/1975 | White et al. | 364/200 |
| 3,879,710 | 4/1975 | Maxemchuk et al. | 364/200 |
| 4,007,441 | 2/1977 | Faber | 364/900 |
| 4,016,369 | 4/1977 | Pedersen | 370/90 |
| 4,019,176 | 4/1977 | Cour et al. | 364/900 |
| 4,038,494 | 7/1977 | Miller et al. | 428/356 |
| 4,042,783 | 8/1977 | Gindi . | |
| 4,071,706 | 1/1978 | Warren | 370/89 |
| 4,103,336 | 7/1978 | Gindi et al. | |
| 4,106,104 | 8/1978 | Nitta et al. | 364/900 |
| 4,247,892 | 1/1981 | Lawrence | 364/200 |
| 4,354,226 | 10/1982 | Flickinger et al. | 364/200 |

FOREIGN PATENT DOCUMENTS

| | | |
|---|---|---|
| 1964009 | 7/1970 | Fed. Rep. of Germany . |
| 2048037 | 11/1972 | Fed. Rep. of Germany . |
| 1350800 | 4/1974 | United Kingdom . |
| 1457058 | 12/1976 | United Kingdom . |
| 1481275 | 7/1977 | United Kingdom . |

OTHER PUBLICATIONS

Peripherals and Interfacing Handbook, published by Digital Equipment Corp., 1971.

*Primary Examiner*—Thomas M. Heckler
*Assistant Examiner*—John G. Mills
*Attorney, Agent, or Firm*—H. M. Stanley; R. B. Megley

[57] ABSTRACT

A data bus system includes a plurality of interconnected active terminals, i.e., terminals which receive data from one terminal and retransmit it or transmit new data to another terminal. The data is in serial digital form and is transmitted within a continuous series of time frames of predetermined length with each time frame being initiated by a control word transmitted by one of the terminals designated the controller terminal. Each terminal includes a counter which counts the bits between control words, and each control word includes an identification of the controller terminal so that each terminal can synchronize its counter with the counter at the controller terminal in accordance with the propagation time of data from the controller terminal. Logic circuitry is provided at each terminal so that one of a plurality of terminals can assume the function of the controller terminal should the presently designated controller terminal fail to generate control words to define the time frames. Within each time frame various of the terminals initiate data at appropriate times in accordance with the count on the counter of the initiating terminal, and the transmitted data is coded with the identification of the receiving terminal or terminals which are to direct the data to users tied in to those terminals.

16 Claims, 18 Drawing Figures

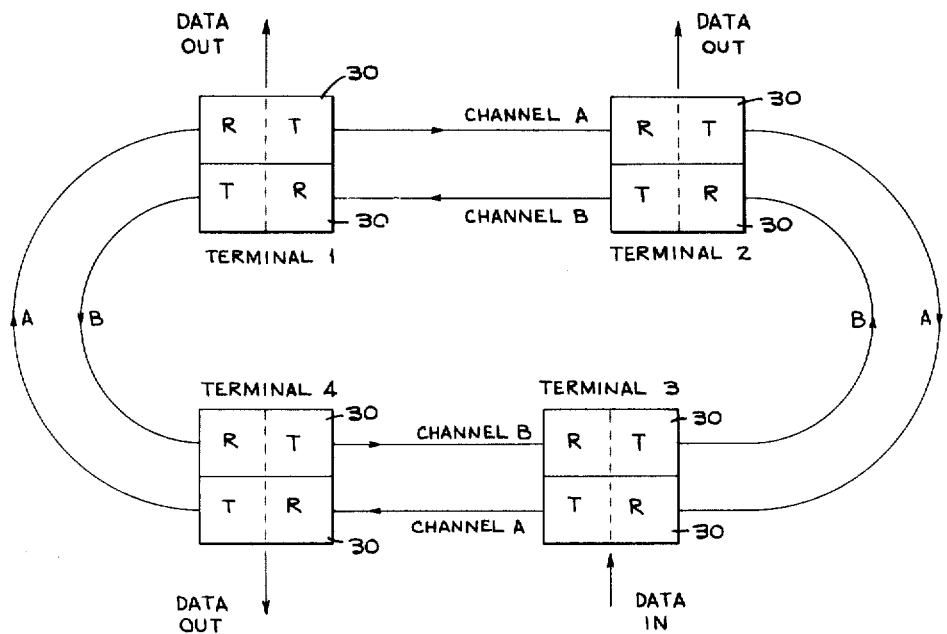
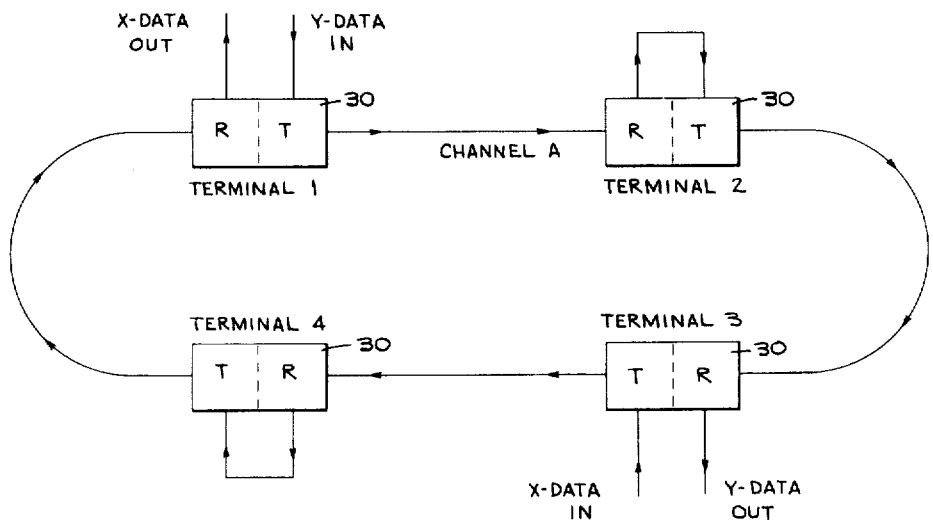
FIG_1
FIG_2

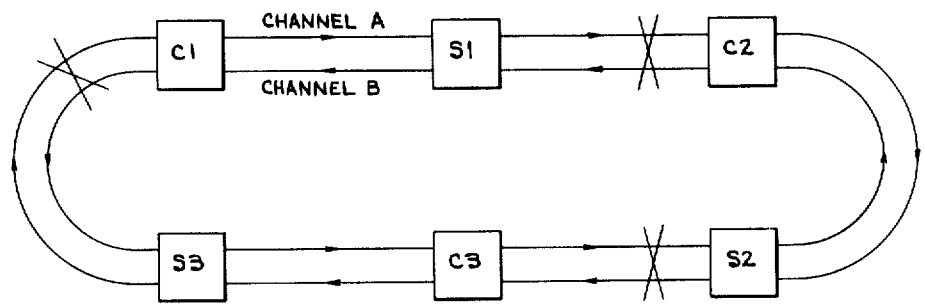
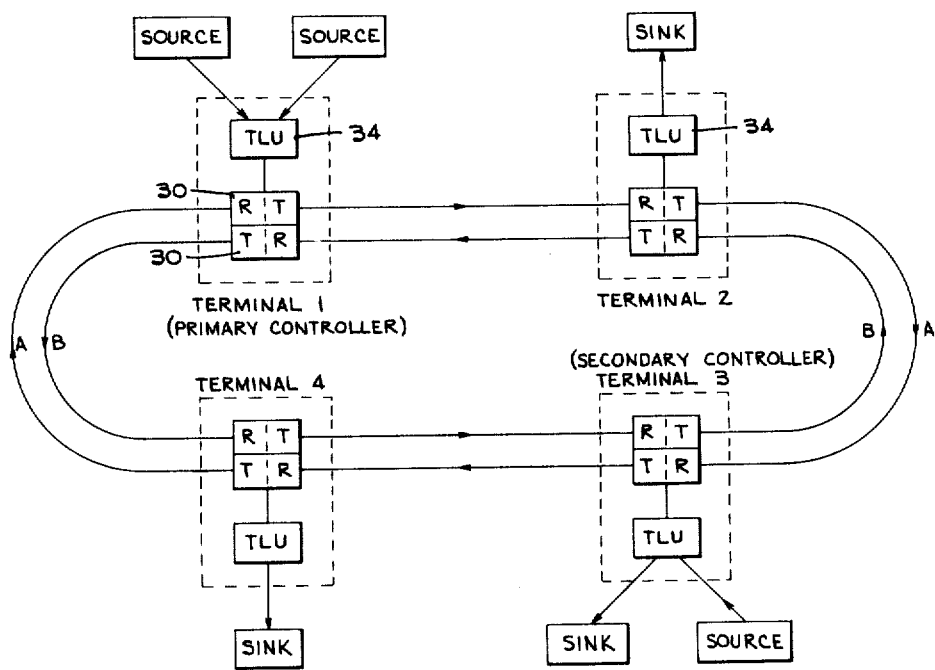

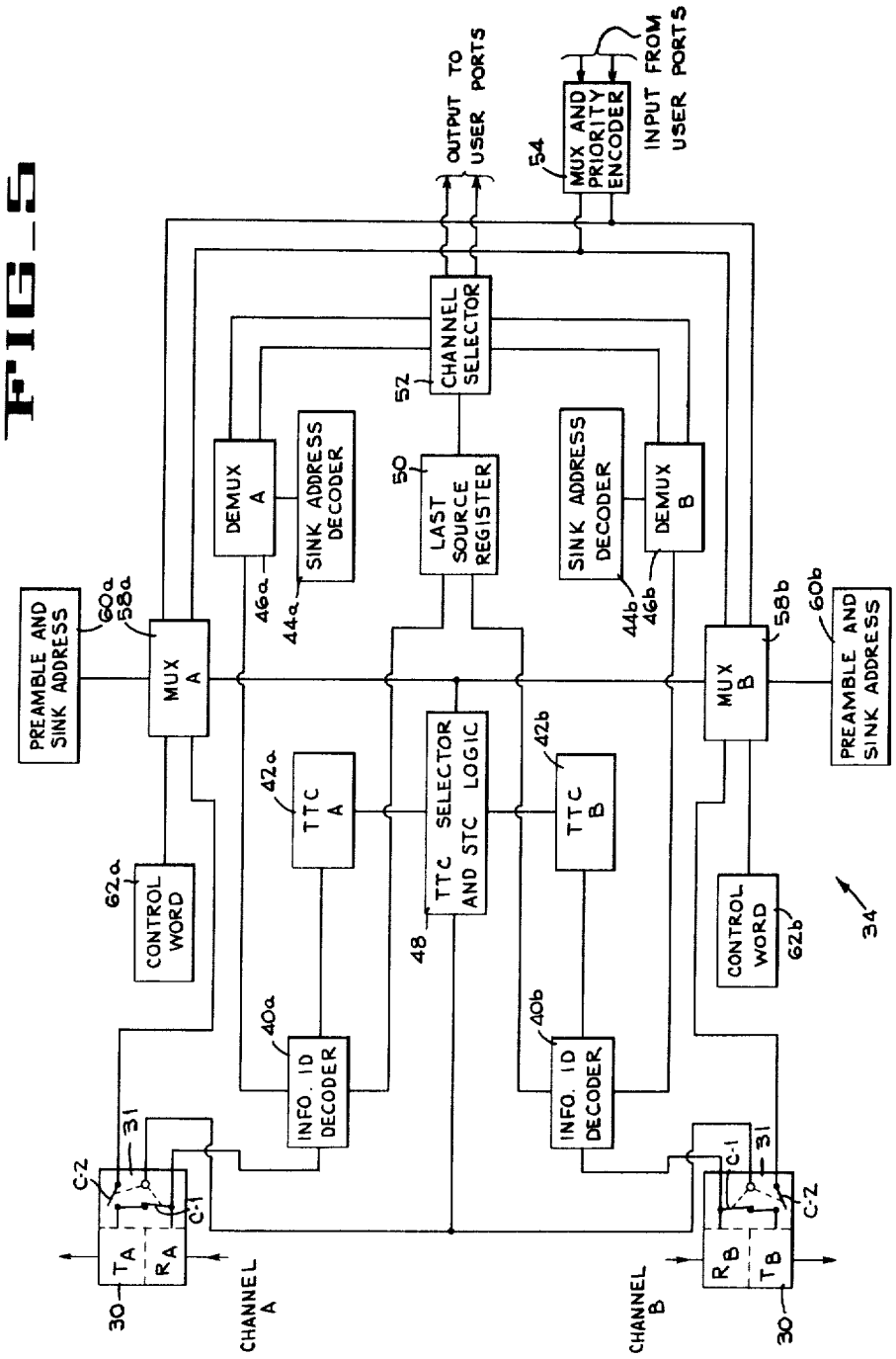
FIG_5

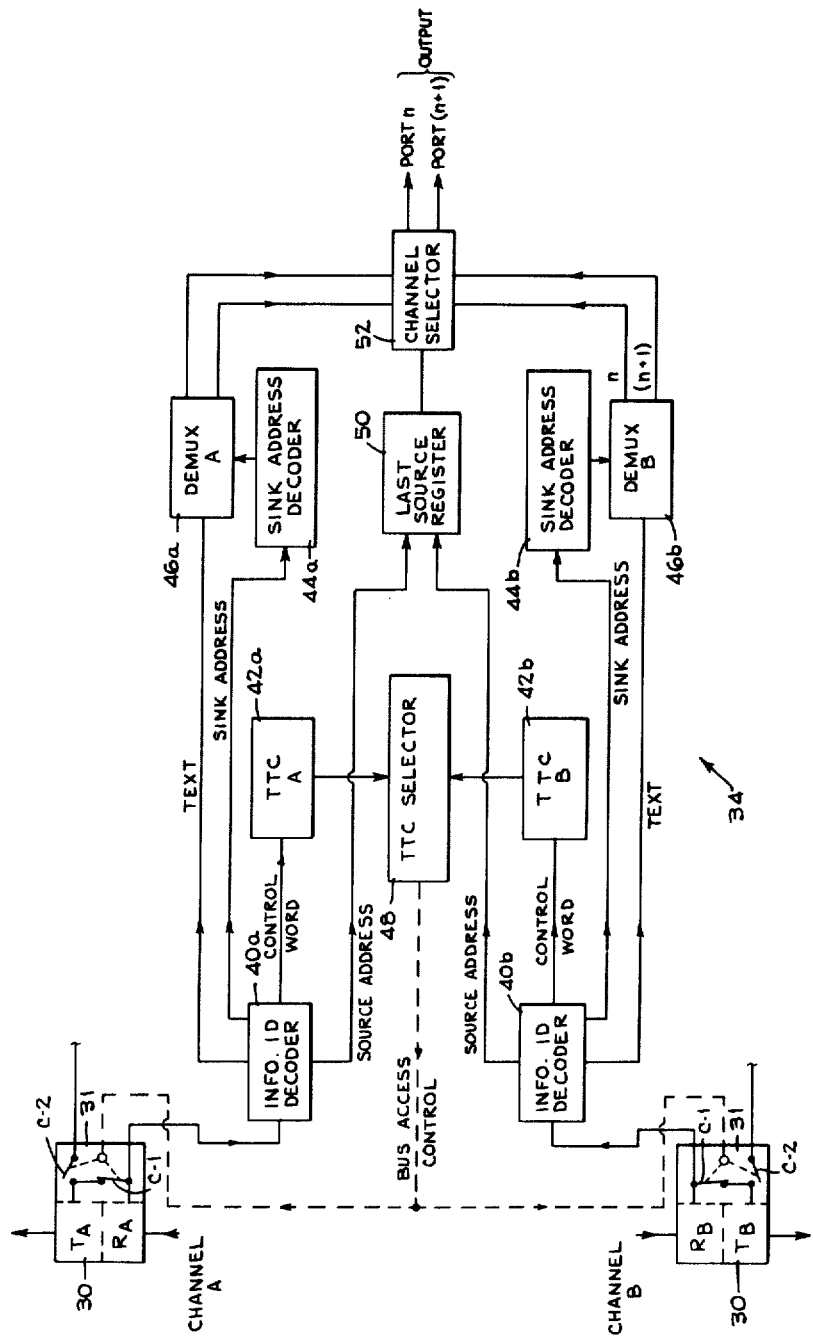

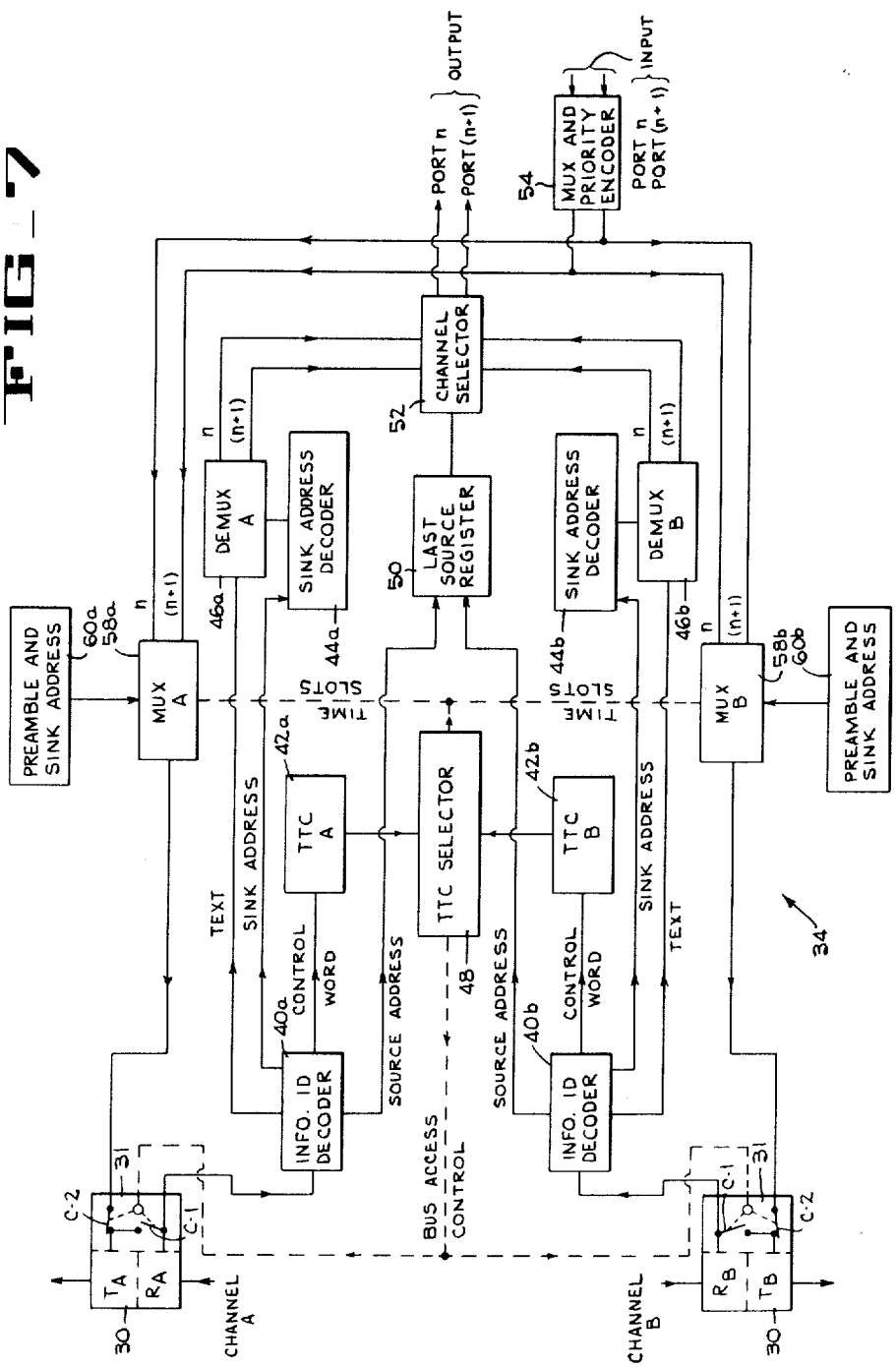

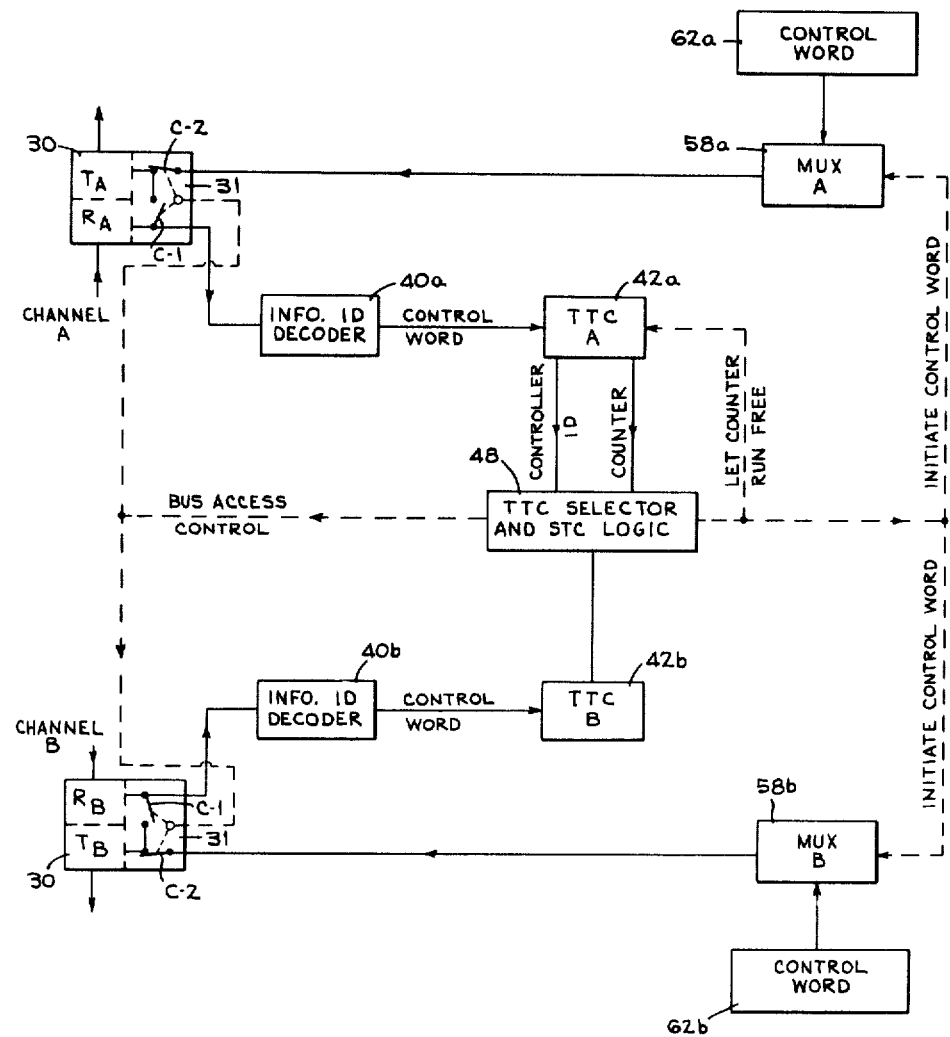

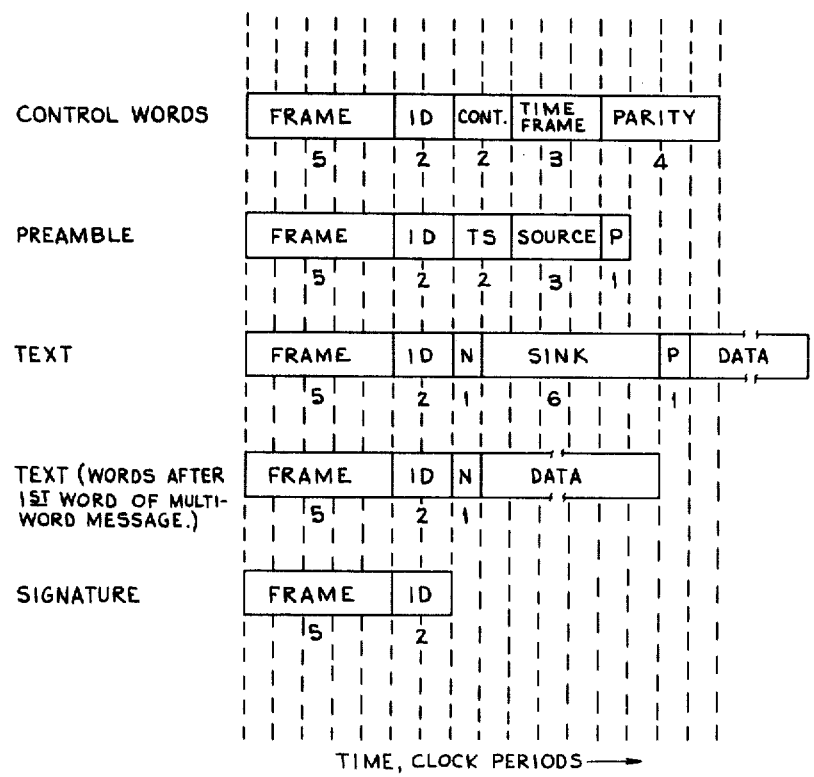
FIG_9

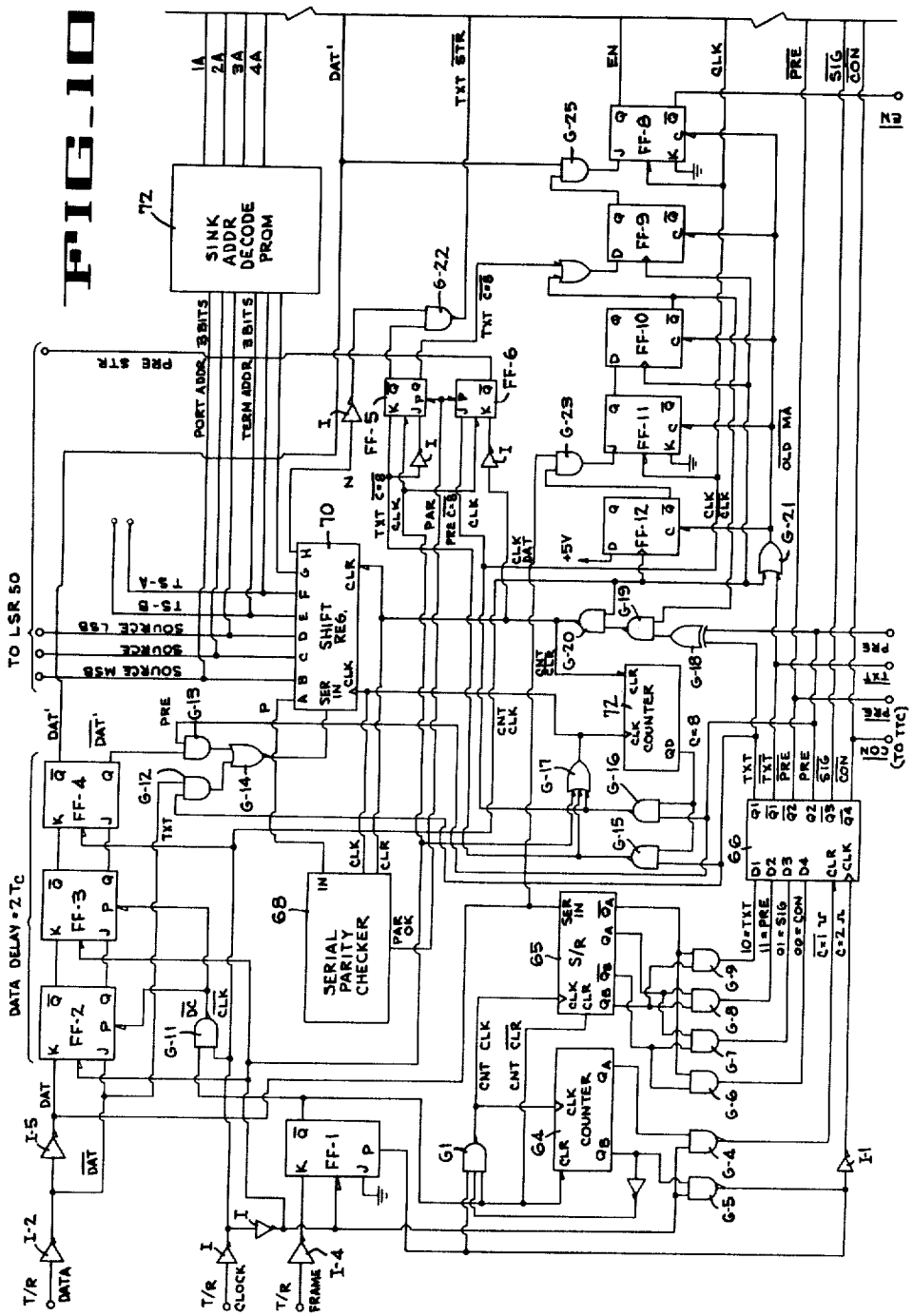

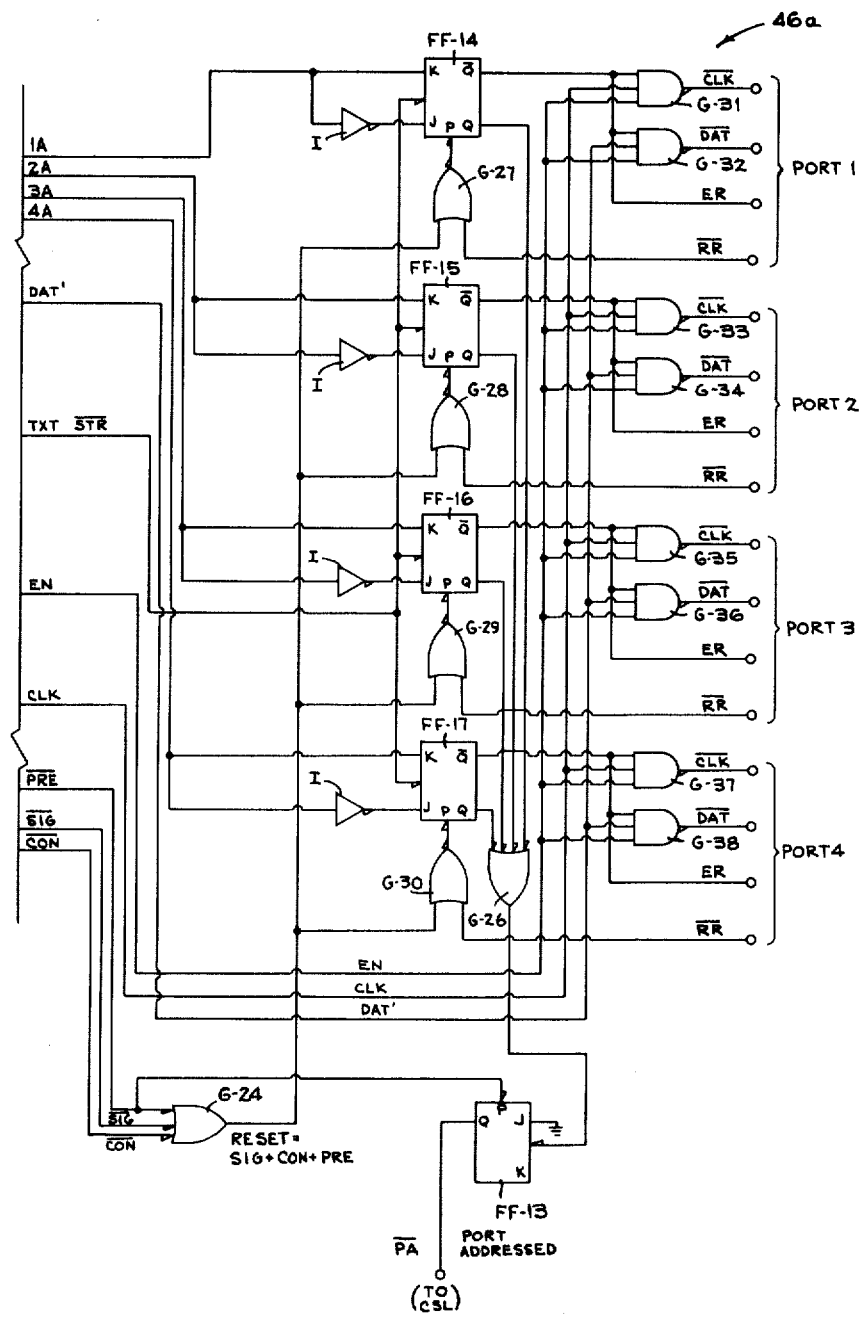

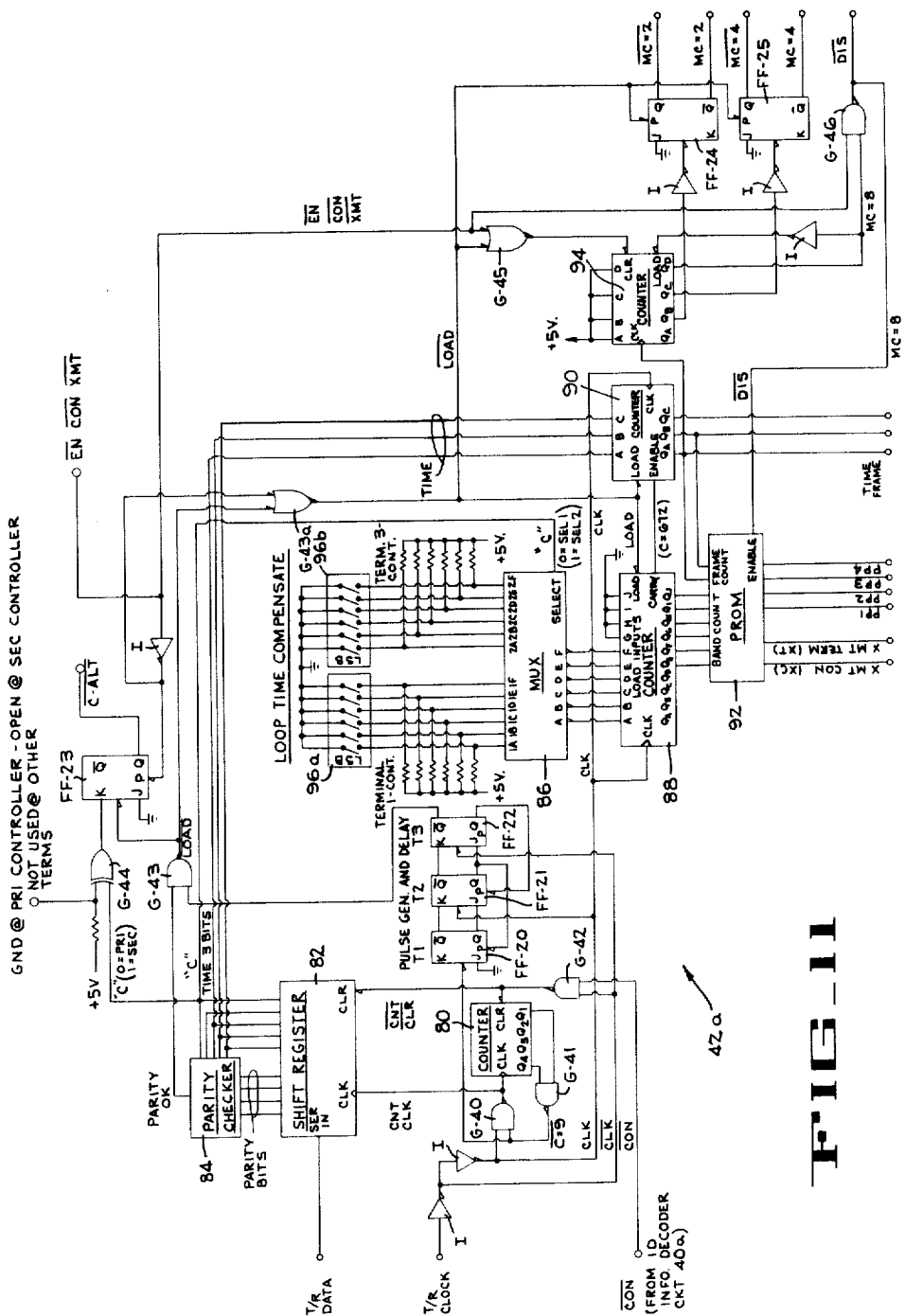
FIG_11

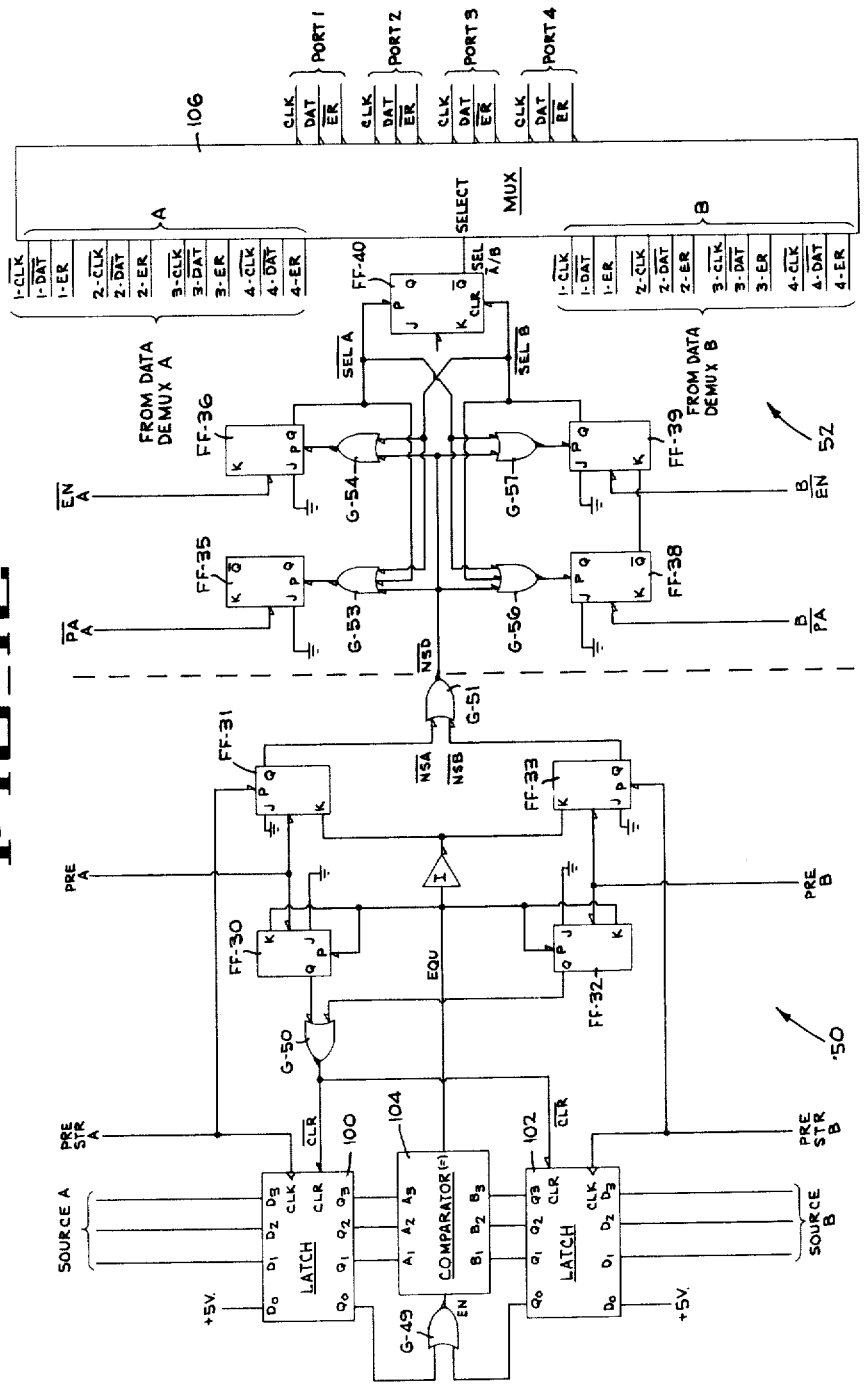
FIG_12

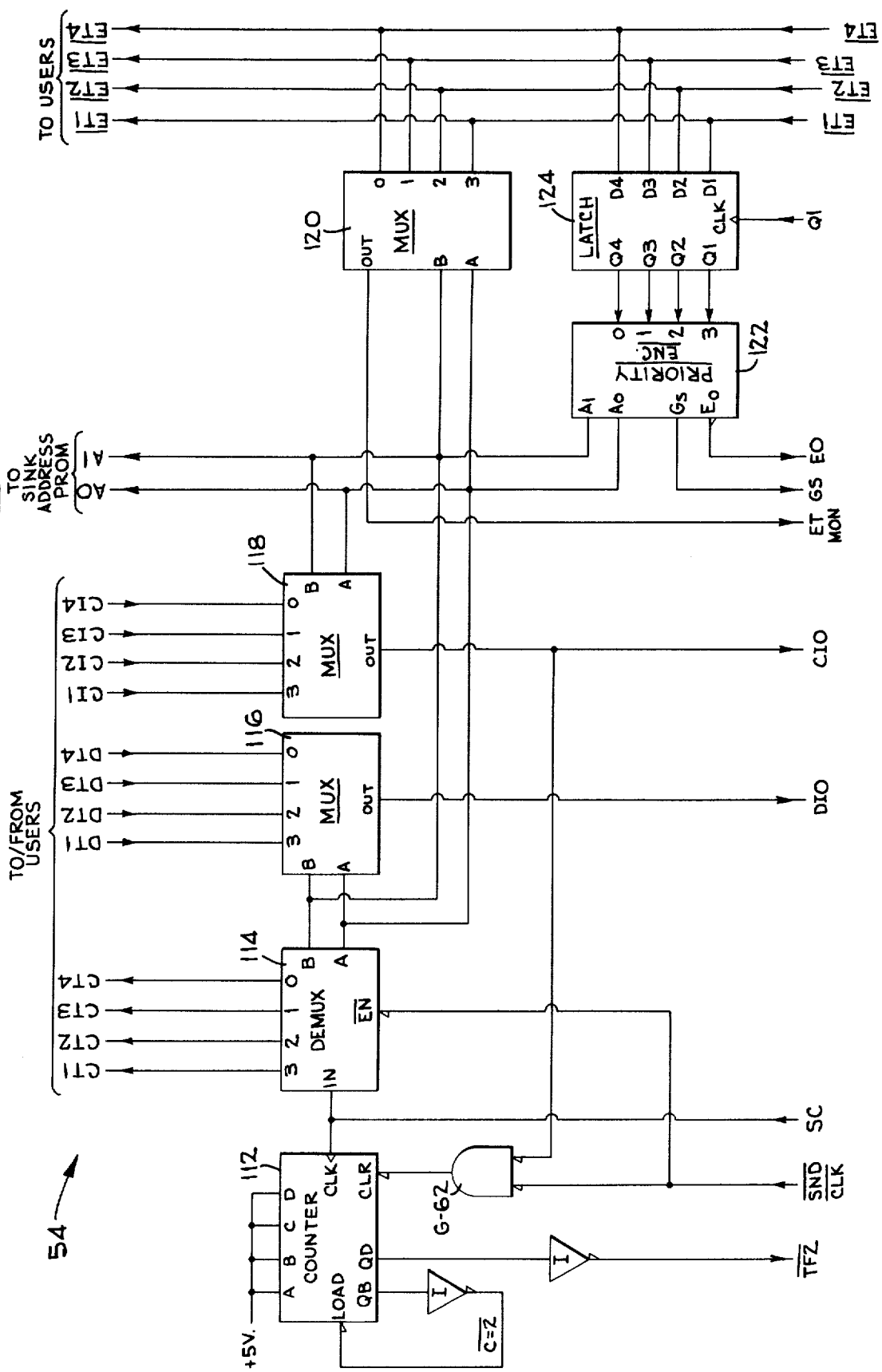
FIG_14

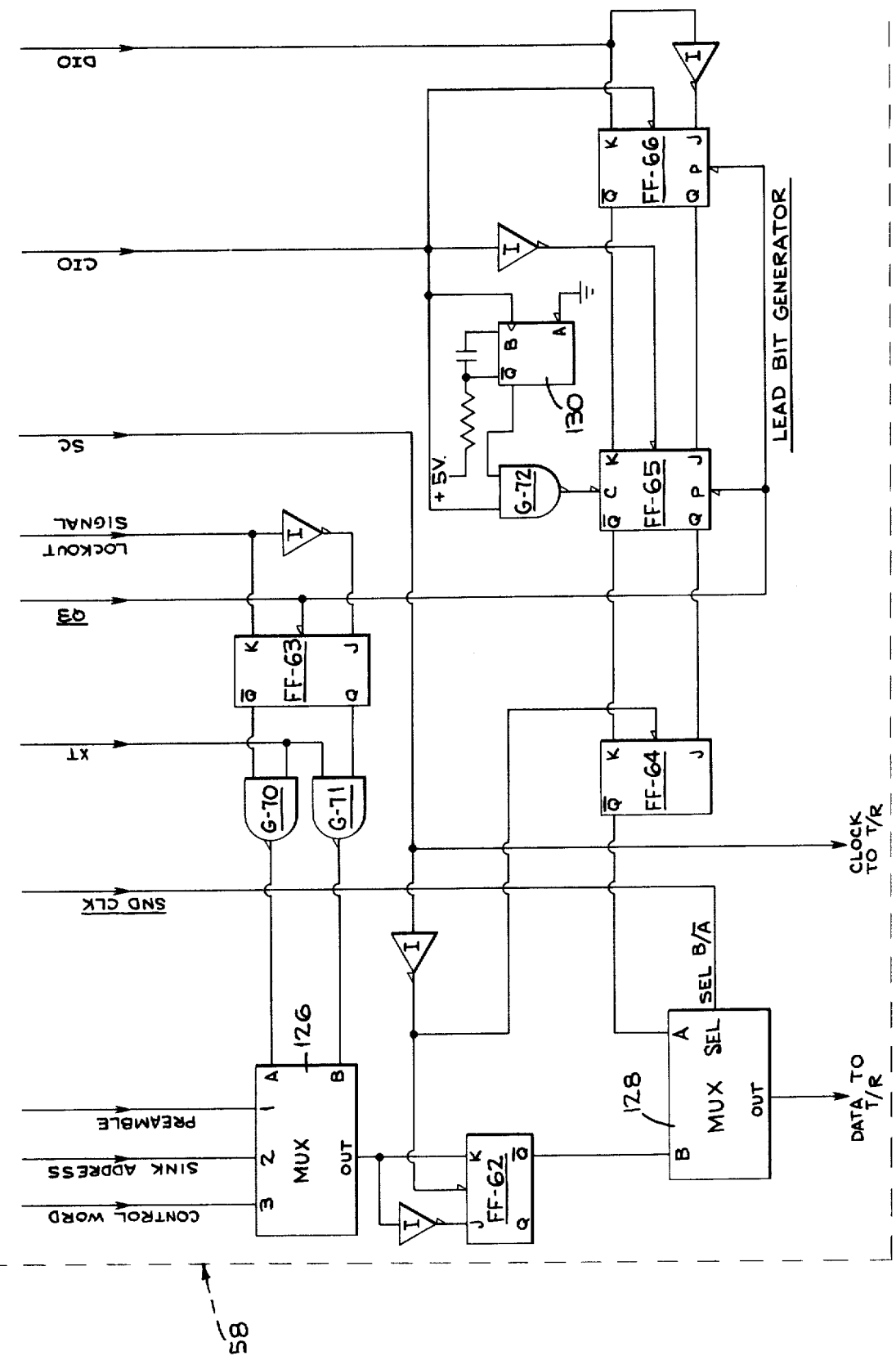
FIG_15

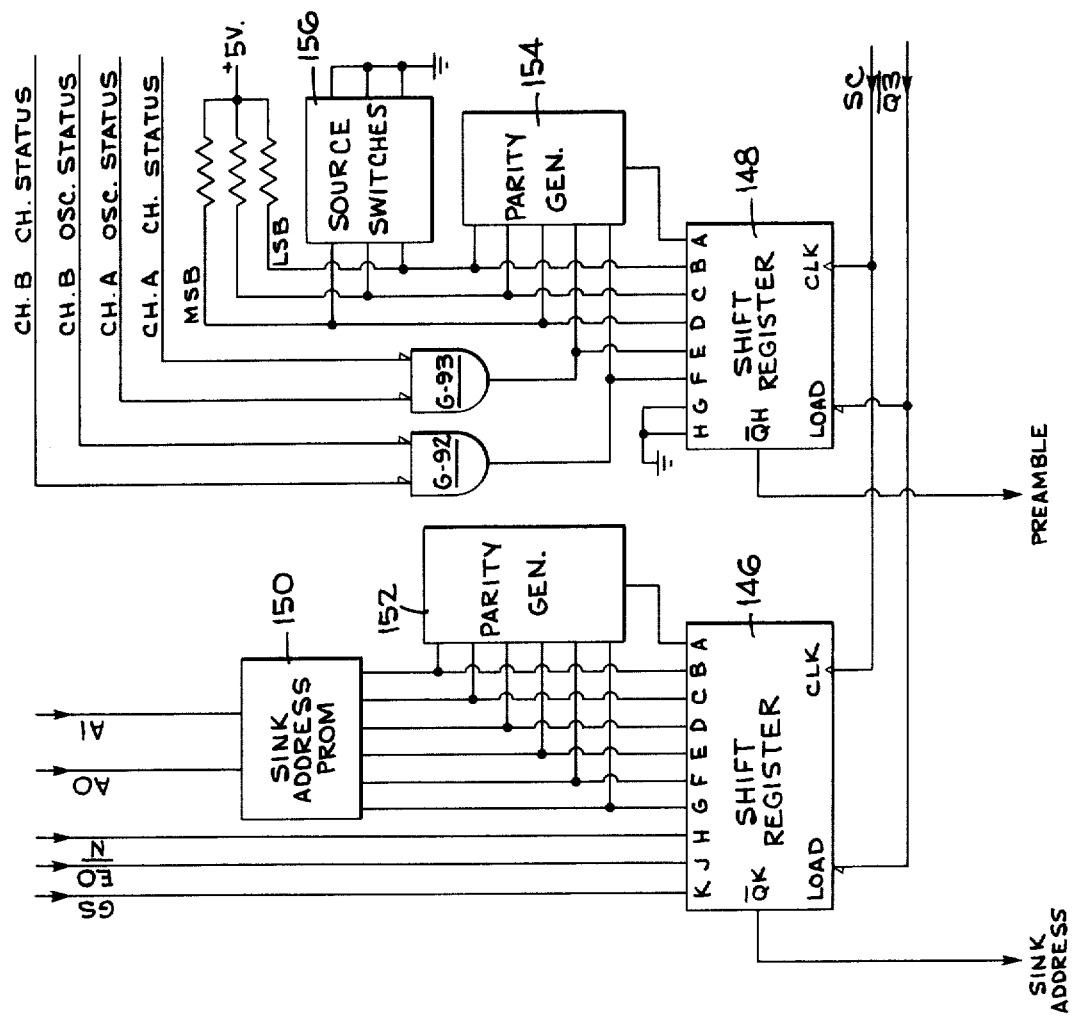
FIG_17
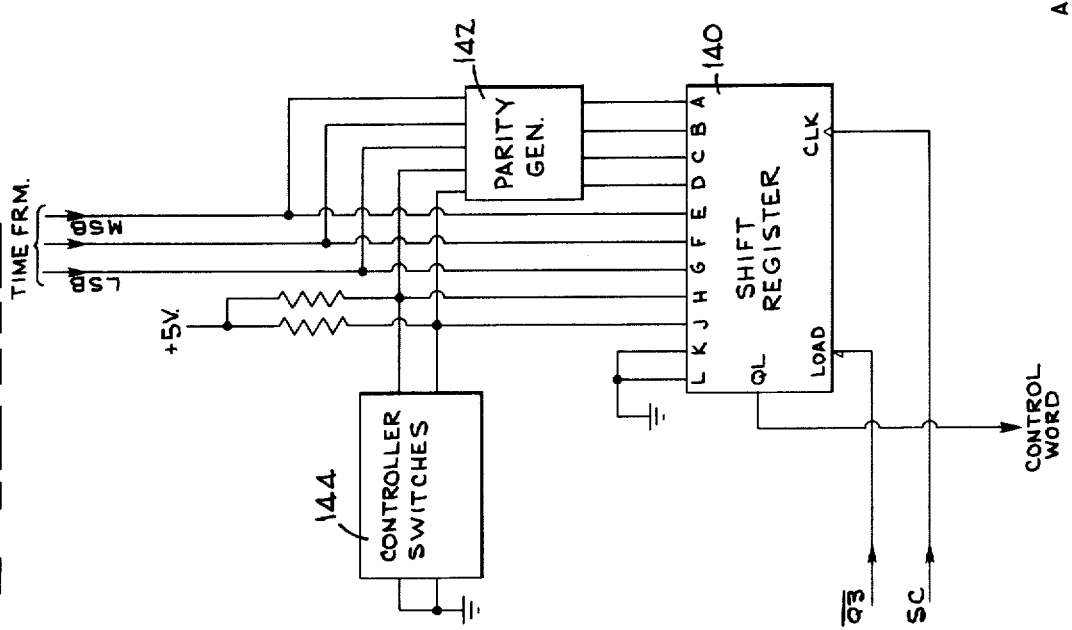
FIG_16

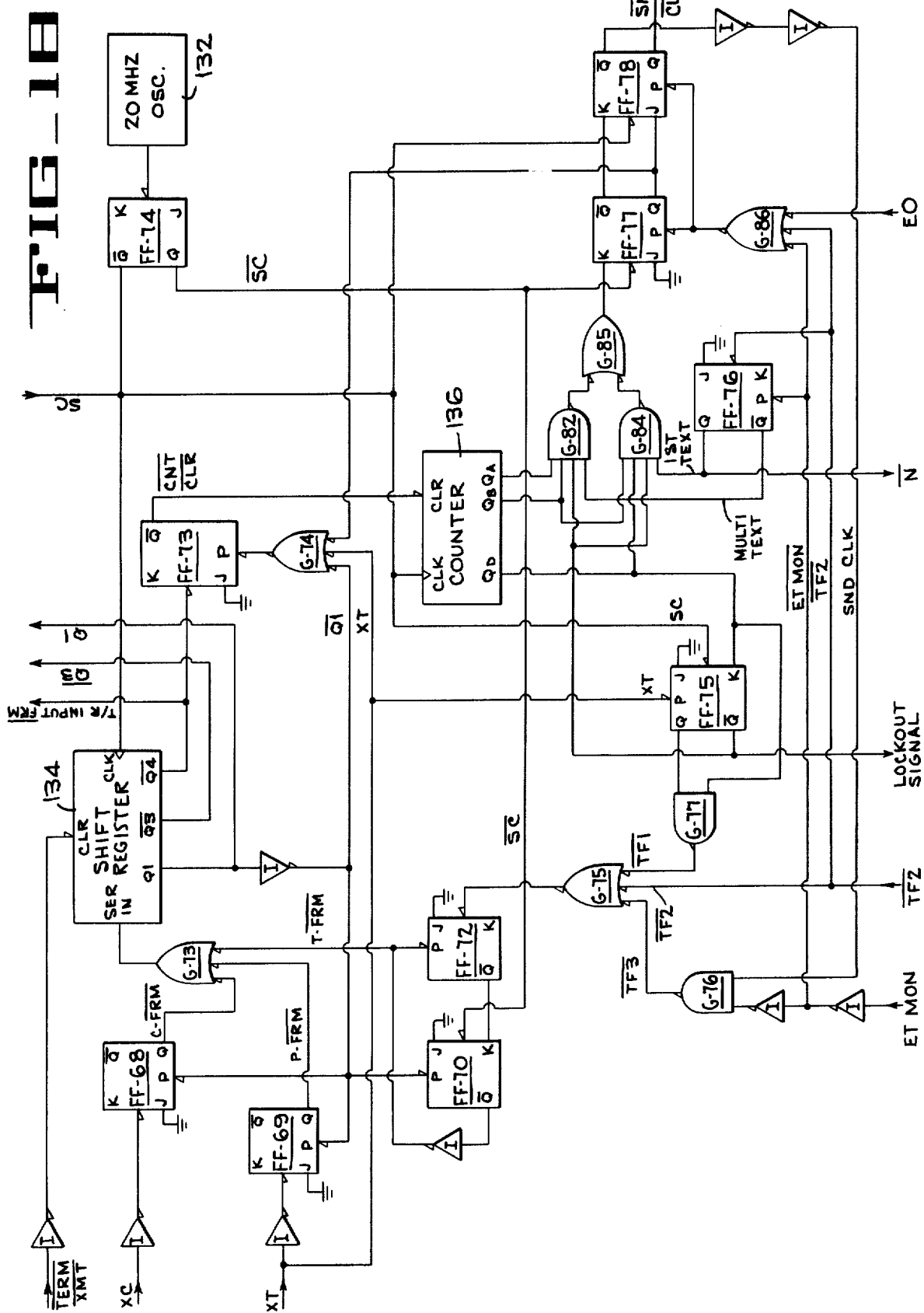

SYNCHRONOUS TIME-SHARED DATA BUS SYSTEM

CROSS REFERENCE TO RELATED APPLICATION

The present application is a continuation-in-part of our prior application Ser. No. 912,780, filed June 5, 1978, now abandoned.

BACKGROUND OF THE INVENTION

1. Field of the Invention

The present invention pertains to data bus systems for transmitting information between a plurality of interconnected and serially arranged terminals, and more particularly, it pertains to data busses of the active type wherein each terminal receives data from one terminal and transmits or retransmits data to the next terminal in the system.

2. Description of the Prior Art

The data bus concept of placing all data onto a single transmission line, or set of transmission lines, and then receiving the data along the line as needed has revolutionized computer architecture and has been instrumental in the development of the microprocessor. This concept is presently being developed for distributing data over larger distances, for example on shipboard, to replace the conventional data distribution systems wherein all receivers and transmitters are directly wired into a central computer or processing unit or wherein a central switchboard functions to distribute messages from and to the various transmitting and receiving units. Such bus systems have the obvious advantage of considerably reducing the amount of cabling required—a factor which can be of considerable importance in the longer distribution systems. Problems are encountered in connection with the longer distribution systems however. For example, at high data rates (i.e., in the megabit range or higher) propagation time between terminals on the bus becomes important and can lead to errors in the received data. Also, with long lines between terminals, the problem of a cable break disabling the entire bus system can become significant.

There are two basic types of data busses which are used in large scale data distribution at the present time, namely, passive busses and active busses. The more typical passive bus system employs transmitters, or drivers, and receivers that couple passively to a transmission line. This is a direct descendant of the current computer data bus technology. The active bus, on the other hand, employs active terminals, each of which receive data from one terminal and then retransmit the data (or transmit new data) to the next terminal in the line with each terminal acting as a potential transmitting and/or receiving point. Thus, in an active data bus, each link between terminals comprises a complete transmission path, whereas in the passive data busses the entire length of the transmission line comprises a single transmission path.

Passive bus systems have a number of disadvantages. For example, a passive transmission line is terminated in its characteristic impedance at each end thereof to absorb the data signal and prevent reflections along the line. The receivers, which tap into the line, must not load the line and will therefore have high impedance inputs. To prevent the transmitters, or drivers, from loading the line, they must be removed from the line when not introducing data which thus has the obvious disadvantage of requiring the rapid switching of power sources into and out of the transmission line.

A variation of the foregoing passive bus system is presently in use wherein all drivers and receivers communicate with the main bus line through separate transmission lines called "stubs". Since each stub presents a reactive discontinuity to the main bus line, even when its driver is "off-line", reflections are introduced at each point that a stub joins the main bus line. These reflections proliferate as the number of stubs increases. Thus, the stubs communicate with the bus line through attenuating "lossy couplers" to reduce the reflections to an acceptable level. While this system works fine at low data rates, when the data rate is high, e.g., in the megabit range or higher, the bit length (defined as the propagating length of a single bit on the data bus line) will oftentimes be less than the bus line length. When this occurs, heroic efforts will be required to prevent the reflections on the line from causing errors in the transmitted data. Furthermore, the large attenuations of the couplers for minimizing the reflections on the line create other problems because of the relatively high driver output level required and the relatively low level of input at the receivers due to the large attenuations. Thus, the receiver stubs tend to be susceptible to the pickup of cross-talk and other forms of electromagnetic interference from nearby machinery, electronic equipment, or power cables. Finally, the receivers operate at a very disadvantageous signal-to-noise ratio at their inputs and therefore require fairly sophisticated hardware in order to extract signals from noise with acceptable accuracy.

Another disadvantage of present data bus systems, particularly the passive bus systems, is the vulnerability of the systems to cable failure whereby a single cable break can disable the entire system even though a portion of the transmitters and receivers on the line are still physically connected. Also, most conventional bus systems have no means of dealing with improper transmission by one of the terminals with the result being—erroneous data on the line.

SUMMARY OF THE INVENTION

The bus system of the present invention overcomes most of the aforementioned problems of the passive bus systems by using an active bus configuration wherein each terminal acts as a sink for one message and a retransmission point or an initiation point of a message to the next terminal. Thus, each data link, i.e., the link between adjacent terminals, is a separate and independent transmission line with its own characteristic impedance to each receiver at the end thereof and the problem of multiple reflections along the transmission line from the various transmitters and receivers is not present.

A particularly important feature of the present invention is the autonomy of the system wherein breaks in the transmission line do not result in a complete failure of the system. In fact, in the well designed system using the principles of the present invention, various subportions of the system are capable of selective independent operation. Thus, like an earthworm, the bus system of the present invention may be chopped into smaller parts with each of the smaller parts continuing to live, The control for the system is not located only at one specific point but is distributed throughout the system in a prearranged order of priority. If one controller's contact with a particular terminal is lost, another terminal can assume control so long as it is in communication with the said terminal, and the system continues to operate without loss of data.

The foregoing is accomplished by means of the particular data transmission scheme which is utilized by the data bus of the present invention. Thus, the data is transmitted in a format wherein a series of continuous time frames of predetermined length are generated by the designated controller terminal. Each time frame is defined by a control word which is put out by the controller terminal in accordance with the count on a counter at the controller terminal. Each terminal in the system which is a potential controller terminal or which may initiate the transmission of data (i.e., a broadcast terminal) includes a similar counter which is synchronized with the counter at the controller terminal by adding counts thereto at the time the control word is generated in accordance with the bit propagation distance from the controller terminal. During a given time frame one or more of the terminals in the system may transmit data with the time at which such data is initiated being determined by the counters of the transmitting terminals.

As pointed out previously, a special feature of the present invention is the fact that the controller terminal does not necessarily have to act as the controller terminal for the system, and, in fact, control is distributed throughout the system on a selective actuation basis as needed. Thus, if the primary controller terminal is disabled for any reason, or, if part of the system is cut off from the primary controller, a secondary controller (or a tertiary controller, etc.) can assume the job of transmitting the control words to define the time frames so that all of the various transmitting terminals and receiving terminals to which the data bus is connected can transmit and receive messages at the proper times with no overlapping data on the line. This selective actuation of various potential controller terminals to keep the entire bus or parts thereof functioning is accomplished automatically by the circuitry of the present invention so that no data will be lost during continuous transmission.

The bus system of the present invention also has the advantage that it is readily expandable or contractable. Furthermore, programming changes in one of the transmitter/receiver links of the system are readily accomplished by changing the control units only at the transmitters and receivers involved without affecting the remainder of the system.

BRIEF DESCRIPTION OF THE DRAWINGS

FIG. 1 is a schematic illustration of a four terminal data bus system utilizing the principles of the present invention.

FIG. 2 is a schematic illustration of one channel of the data bus of FIG. 1 illustrating the condition wherein a full duplex operation of the bus system is in operation.

FIG. 3 is a diagrammatic illustration of a six terminal data bus system in accordance with the present invention illustrating the survivability of various portions of the system when the data bus is broken at several points.

FIG. 4 is an expanded schematic diagram of the data bus of FIG. 1 illustrating in block form the circuit components at the terminal points.

FIG. 5 is a schematic block diagram illustration of the terminal logic unit circuitry at each of the terminals.

FIG. 6 is a schematic illustration of the terminal logic unit circuitry of FIG. 5 illustrating the data flow when the terminal is in the relay mode with the data being shown in solid lines and with the control signals being shown in dashed lines.

FIG. 7 is a schematic diagram similar to FIG. 6, but showing the terminal logic unit circuitry data flow and control signals generated when the terminal is transmitting, or in its access mode.

FIG. 8 is a schematic diagram similar to FIGS. 6 and 7, but illustrating the terminal logic unit circuitry data flow and control signals generated when the terminal is in its active control mode.

FIG. 9 is a timing chart illustrating an example of a data transmission format which can be used with the data bus of the present invention.

FIGS. 10 and 10A comprise a schematic diagram of the circuitry for one of the information identification decoders and demultiplexers of the terminal logic unit circuitry.

FIG. 11 is a schematic diagram of the circuitry for one of the terminal traffic controllers of the terminal logic unit circuitry.

FIG. 12 is a schematic diagram of the circuitry for the last source register and the channel selector of the terminal logic unit circuitry.

FIG. 14 is a schematic diagram of the multiplexer and priority encoder circuits of the terminal logic unit circuitry.

FIG. 15 is a schematic diagram of one of the output multiplexer circuits of the terminal logic unit circuitry.

FIG. 16 is a schematic diagram of one of the control word generator circuits of the terminal logic unit circuitry.

FIG. 17 is a schematic diagram of one of the preamble and sink address generator circuits of the terminal logic unit circuitry.

FIG. 18 is a schematic diagram of the transmission control logic circuitry for controlling the operation of the circuits of FIGS. 15, 16 and 17.

DESCRIPTION OF THE PREFERRED EMBODIMENT

Figure 13:
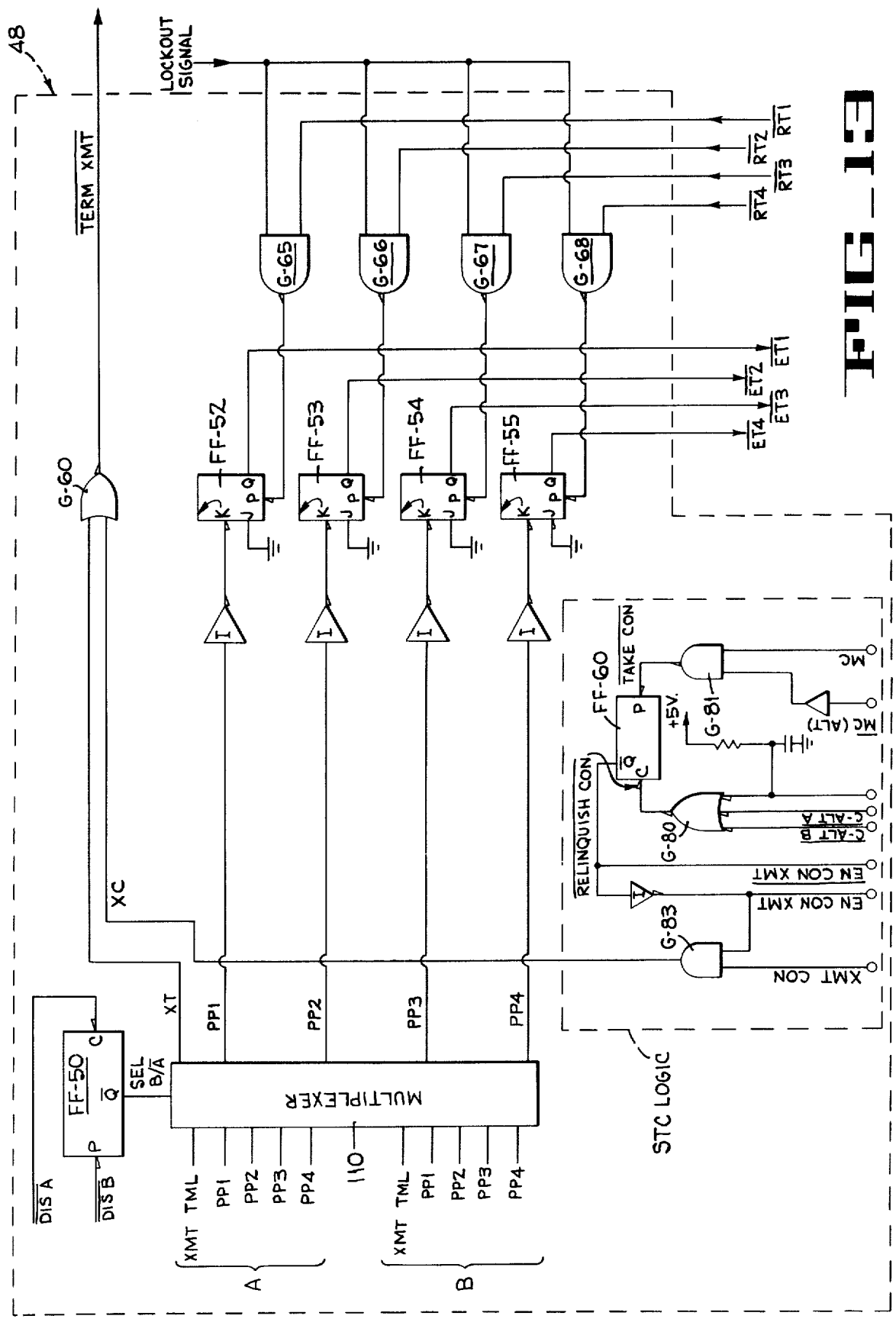
FIG. 13 is a schematic diagram of the terminal traffic control selector and system traffic control logic circuit of the terminal logic unit circuitry.

The basic configuration of the data bus system of the present invention is illustrated in FIG. 1 of the drawings. For simplicity's sake, only four terminals are illustrated with such terminals being connected by the bus in a closed loop configuration. However, it is within the scope of the present invention to accommodate a considerably greater number of terminals each of which is capable of both transmitting and receiving data and which may be readily added to or subtracted from the loop as desired. Furthermore, although the loop configuration is shown, it is within the scope of the present invention to accommodate other architectural systems for bussing data. For example, a linear bus system could be used, or a bus with one or more branches is also feasible so long as one continuous transmission path for the data is provided.

As shown in FIG. 1, each terminal comprises two transmitter/receiver (T/R) modules 30 which are mounted back to back and which serve to transmit and receive data on one of two lines (identified as channel A and channel B) with the lines transmitting data in opposite directions around the loop. Each of the transmitter/receiver modules acts as a receiver for data carried down the associated channel on the bus and as a retransmitter of such data to the next adjacent terminal during the normal relay mode of the module. However, when the particular terminal is transmitting, i.e., in its access mode, the T/R modules break both channels so that the received data terminates at such terminal, and new data is transmitted therefrom, such data coming from a source connected directly to the terminal (not illustrated in FIG. 1). A terminal which is the initiator of data will be referred to hereafter as a broadcast terminal as contrasted with those terminals whose only function is to receive and retransmit data. The particular construction and circuitry of the T/R modules used in the system of the present invention is shown in prior U.S. Pat. No. 4,038,494 to George W. Miller et al, the disclosure of which patent is specifically incorporated herein by reference.

It will be seen that by providing two transmitter/receiver modules 30 at each terminal, each terminal receives and transmits about the loop in two opposite directions. Thus, one of the modules is used to transmit in one direction on the indicated channel A while the complementary module is used to transmit data in the opposite direction on the complementary channel B. This particular configuration provides complementary closed loops and completementary redundancy for the system wherein not only is a redundant circuit provided (a necessary safeguard in most modern communication systems), but the transmission paths of the two circuits are complementary to each other so that if a break occurs between any two terminals, no loss of data transmission from or reception by any of the terminals in the system will occur. This is contrasted with a conventional bus system wherein a break between two terminals severs at least all further communication between those terminals, and in many cases, renders the entire system unuseable.

The method of transmitting data with the bus of the present invention is by a serial digital format as disclosed in the aforementioned U.S. Pat. No. 4,038,494, and a synchronous time-shared system is provided wherein time division multiplexing is used to provide access for the various broadcasting, or transmission initiating, terminals to the bus. Thus, one of the terminals, for example Terminal 1, is normally designated as the primary controller terminal whose function it will be to broadcast so called control words at regular predetermined time intervals which control words initiate and define specific time frames for the transmission of data between the various terminals connected to the bus. Within each of the time frames, one or more of the terminals is assigned a particular time slot to transmit data. All of the terminals are synchronized with the controller terminal through a novel synchronization method. Synchronization is necessary because the bus system of the present invention is designed to operate at very high data transmission rates, e.g., 10 megahertz, wherein the distances between the terminals create significant bit propagation times which must be accounted for. As will be described in greater detail hereinafter, each of the terminals on the bus is provided with a clock which is synchronized with the clock at the designated controller terminal so that all of the terminals operate in synchronism. Furthermore, and as will also be explained in greater detail hereinafter, no one single terminal need continuously act as the designated controller terminal. Indeed, the circuitry of the present invention is arranged so that any one of two terminals can act as the controller terminal. In this way, even if the primary controller terminal malfunctions, or is disabled, another terminal will take over as a secondary controller terminal so that the terminals still in operation will be able to continue operating and providing synchronized communication from and to any terminals which are still connected to the bus.

The normal transmission method is to have various terminals transmitting messages at different prearranged times within a single time frame. Also, the time frames can be separately identified by the initiating control word so that different terminals transmit in different sequences during different time frames. FIG. 9 illustrates a type of transmission format which can be used with the system of the present invention. The types of transmitting patterns are respectively identified as control words, preamble, text (2 types), and signature. The length of each pattern is depicted by its bit length with the number of bits in each portion of the pattern being given in FIG. 9. Thus, the control word, which initiates each time frame, includes a 5-bit framing signal, a 2-bit identification (ID) signal which defines the type of pattern (i.e., control word), a 2-bit signal identifying the controller terminal which is initiating the control word, a 3-bit signal identifying the time frame (wherein different time frames require different terminal transmission sequences), and a 4-bit parity signal. The framing signal comprises a unique 3-bit synchronizing signal (defined in the aforementioned U.S. Pat. No. 4,038,494) preceded by two binary zeros, or "dead bits", to prevent the overlapping of data from a previous transmission. It will be noted that the 5-bit framing signal is a unique code which precedes each transmission pattern and is inserted by the initiating terminal to assure proper alignment of the clock to the data as it is transmitted by the T/R module 30.

Following the generation of the control word, one or more terminals will transmit data during a time frame with each such transmission being initiated by a 13-bit preamble pattern which is generated by the transmitting terminal. The timing of the preamble generation is controlled by the synchronized counter at the terminal with a particular count on such counter initiating the transmission sequence. The preamble includes the framing signal, the identification (ID) signal which identifies the preamble pattern, a 2-bit terminal status (TS) signal which indicates which channels are active and transmitting, a 3-bit signal identifying the source of the broadcast (i.e., the transmission initiating terminal), and a parity bit.

At the conclusion of the preamble the broadcasting terminal transmits one or more text words which include the relevant data message. The first text word is preceded by a pattern, as illustrated, which includes a framing signal, the identification (ID) signal identifying the pattern as text, an "N" bit which is a "0" for a single text word message and for the first text word of a multi-word message and which is "1" for the second and following text words of a multi-word message, a 6-bit code identifying the terminal or terminals and the terminal port or ports which are to receive the message, and a parity bit followed by the message. The first bit of the message is known as the lead bit and is always a "1" in the transmission format described. The following words in a multi-word text (with the same source and sink) are defined by only an 8-bit signal including the framing signal, the ID signal, and an "N" bit of "0" followed by the data or message.

When a terminal is through with its transmission it signs off with a 7-bit signature pattern including the framing signal and the ID signal which notifies all terminals that the message is completed and which can be used in the logic circuitry at the user terminals for resetting their circuits for the next transmission sequence.

A special transmitting arrangement is disclosed in FIG. 2 wherein two terminals, terminal 1 and terminal 3, may transmit to each other at the same time in what is known as a full duplex operation. Thus, the channel A transmitter/receiver module 30 at terminal 1 transmits in one direction to terminal 3 while terminal 3 is at the same time transmitting in the same direction to the receiving portion of the module at terminal 1. FIG. 2 shows only the channel A communication loop, it being recognized that the complementary T/R modules at terminals 1 and 3 will be simultaneously transmitting in the opposite direction on channel B. As shown in FIG. 2, when terminals 1 and 3 are in direct communication, terminals 2 and 4 are merely acting as "repeaters", i.e., they are only functioning to receive and retransmit the data along the bus. With respect to the transmission format of FIG. 9 previously described, it will be recognized that both terminals 1 and 3 will be programmed to initiate preambles at the same time each of which will only be received by one-half of the loop and will therefore not interfere with one another.

The autonomity feature of the present invention is illustrated in FIG. 3 wherein an expanded loop configuration is shown comprising six terminals. The terminals have been given the letter designations C or S depending upon whether such terminals are potential controller terminals (C1, C2, C3) or secondary terminals (S1, S2, S3) having no potential controlling function. Thus, the controller terminals all must be capable of generating control words to accept control of the entire loop whereas the secondary terminals have no such controlling capability. While all of the terminals could potentially be controllers, it will be obvious that there is no point in providing for control capability in any more than every other terminal since each control terminal must have at least one other terminal to control.

To illustrate the survivability of the data bus loop of FIG. 3, we will assume first an intact loop with terminal C1 acting as the primary controller by periodically providing control words in the data train to which all of the other terminals are synchronized through their counters. If first there is a break (in both channels) between C1 and S3, C1 will remain in control even though transmission will only be received on channel A therefrom. If subsequently, however, a break occurs between S1 and C2 as shown, controller C1 will continue to control terminal S1 but this link will now be isolated from the remainder of the loop. Secondary controller C2 will take over the control for terminals S2, C3 and S3 so that these four terminals will continue to function as before but with a new terminal providing the periodic control words. Since a new controller is in command, the counters at terminals S2, C3 and S3 will be resynchronized with the C2 counter. If subsequently a break occurs between S2 and C3 as shown, controller C2 will continue its control of terminal S2, but controller C3 will assume control of terminal S3. Thus, we will be left with three entirely separate and independent data links each containing two terminals which will continue to operate in the same data format although each terminal will be capable of full communication only with one other terminal. This is contrasted with the normal single controller bus system where a failure at the controller terminal disables the entire system and prevents further communication anywhere on the bus.

A more detailed illustration of the components of the various terminals is shown in FIG. 4 of the drawings. The operation of both of the transmitter/receiver modules 30 at each terminal will be seen to be controlled by a terminal logic unit (TLU) circuit 34 which interfaces with the various sources and sinks, i.e., data providers and users respectively, at the various terminals. In accordance with the present invention, the sinks and sources may vary in number and kind at any terminal, and they may be readily changed with a mere change in the programming logic for the particular terminal without affecting the overall control arrangement for the entire bus system. In the arrangement to be described, each terminal will have four user ports for the data sinks and sources.

The particular circuitry of the terminal logic unit circuit 34 is shown in functional block diagram form in FIG. 5. It will be noted that a plural path switch 31 is provided in each of the transmitter/receiver modules 30 at a terminal whereby the module operates in one of two conditions. In the normal operating mode as shown in FIG. 5, the contacts C-1 are closed and the contacts C-2 are open so that all data received by a T/R module is directed to the transmitting portion of the module for retransmission down the bus to the next terminal in the manner set forth in the aforementioned U. S. Pat. No. 4,038,494. The data, however, is also monitored by the terminal logic unit 34 of the terminal where it is decoded and demultiplexed to the various users, i.e., sinks, at the terminal if they are to receive the data and if they have indicated to the TLU that they are ready to receive such data. In the alternate operating mode, the contacts C-2 are closed and the contacts C-1 are open so that the link between the transmitting and receiving portions of the T/R modules is broken. That is to say, the continuous chain of terminals is opened at this point to permit the broadcasting of data thereon. In this mode the terminal is in its transmitting mode, and all data terminates at the terminal. Fresh data, generated in a source connected to a user port of the terminal and properly addressed and coded by the TLU, is transmitted on both channel A and channel B by the terminal, such data traveling around the loop in opposite directions until it terminates back at the transmitting T/R module. Of course, the function of the switches 31 are performed by logic circuitry in the actual T/R circuits due to the high switching rates required, the relay type switches being shown in the block diagram illustration of FIG. 5 only for the purpose of a ready explanation of the function accomplished thereby.

The terminal logic unit circuit 34 provides all of the logic functions required by the terminal including multiplexing and demultiplexing, addressing and formatting all data, traffic control and interfacing. As previously explained, each terminal both transmits and receives on both a channel A and a complementary channel B. When a terminal is acting in its transmitting, or access mode, data is transmitted simultaneously on both channels. When a terminal is in its relay mode, however, data may be outputed to the users from that channel which arrives first while the data on the alternate channel is suppressed by the TLU circuitry 34. This insures that the received data at each terminal will be as fresh as possible. It also provides automatic switchover in the case of channel failure without requiring that the failure be detected.

As seen in FIG. 5, the TLU circuit 34 associated with each terminal includes for each channel an information identification decoder circuit 40a, 40b which decodes and routes the incoming data, a demultiplexer circuit 46a, 46b, a sink address decoder 44a, 44b, and a terminal traffic controller (TTC) circuit 42a, 42b which determines the terminal operating mode and defines the time slots for the transmitters connected to the terminal and which includes the aforementioned counter which keeps the system in synchronism. Each channel also includes, for transmission, a circuit 60a, 60b for providing the preamble and sink address, a circuit 62a, 62b for providing the control word (if the terminal is acting as the controller terminal), and a multiplexer circuit 58a, 58b. In addition, each TLU includes a TTC selector and system traffic control (STC) logic circuit 48 which receives inputs from the TTC circuits from both channels, a last source register 50 and channel selector circuit 52 which determines the channel which will transmit the data to the user ports. A multiplexer and priority encoder circuit 54 is utilized during the terminal transmitting operation to control transmission from the sources connected to the terminal.

The three operating modes of each terminal will now be described in detail. The first operating mode is the relay mode wherein the terminal receives and retransmits data. This mode is shown in FIG. 6 with only the necessary portions of the TLU circuitry 34 being illustrated and with the data flow paths being shown with arrows in full lines and with the control signals being indicated by dashed lines. As previously explained, during the relay mode of operation a terminal serves only as a repeater station to relay data along the bus; however, during such operation, it continuously receives all data on the bus and may output properly addressed portions of such data to a sink connected to one of the terminal ports. It does not have access to the bus however and cannot introduce data to the bus while in this operating mode. In the example given for the transmission format to be used with the bus system in the present invention, all data is referenced by a special information identification code which identifies the data as either a control word, a preamble, text or a signature. This information I.D. is decoded in decoder circuits 40a, 40b (one for each channel) which then serve to route the data to the appropriate location. Each decoder 40a, 40b sends the control word to the terminal traffic controller circuit 42a or 42b which decodes the identity code of the active controlling terminal and adjusts the counter contained therein so that it will be in synchronism with the identical counter in the TTC circuit of such controller terminal. This is necessary since the various terminals on the bus may be located at distances wherein propagation time of the data along the bus at high data rates will result in delays of several bits. Thus, each counter at each terminal includes a switch array for presetting the counter with a number based on the location of the active controller relative to the receiving terminal. Upon the reception of the control word and the identification of the controller terminal by the TTC circuit, the appropriate number will be input to the counter so that, at that instant, the counter at the terminal and the controller terminal counter will be in exact synchronism, i.e., they will have the same count appearing therein. The two TTC circuits 42a and 42b will, in general, receive the transmitted control words at different times; however, the bit count on their counters will be in agreement since the preset inputs to the counters will vary in accordance with the different transmission paths from the controller terminal.

Only one TTC circuit 42a or 42b will control the operating mode of each terminal, with the selection being made by a TTC selector circuit 48 which will provide a control signal to the T/R modules 30 in order to maintain the modules in their relay mode.

When a data "message" is received by a terminal the information I.D. decoders 40a, 40b also extract the source address from the preamble and deliver it to the last source register circuit 50 where it is stored to be used in determining which of the two channels will be outputed to the user sink. The channel selector circuit 52 then makes such determination and acts as a multiplexer to route data from one of the channels to the appropriate output port where the user sink is located. Since the data is being provided through the demultiplexers 46a, 46b to the channel selector circuit, the channel selector circuit will normally output the first data received. However, when a new transmitting terminal comes on the line, data may be received first from the opposite channel. In order to distinguish between this condition and the normal condition wherein the second channel's data is merely redundant data received after that from the first channel, the last source register is used to note a new transmitting source so as to condition the channel selector circuit to watch for new data.

When the TLU circuitry 34 is in the access (transmitting) mode, the conditions are as shown in FIG. 7 of the drawings. This mode will occur when each TTC circuit 42a and 42b determines that the time frame number and bit count in the counter correspond to a programmed time slot in the TTC's PROM. This activates TTC selector circuit 48 to provide a bus access control signal which operates to reverse the contacts C-1, C-2 in the T/R modules 30 to break the loop at the terminal and allow direct access to the loop from the input ports at the terminal. At the same time, time slot control signals are sent to the multiplexer circuits 58a, 58b to condition these circuits for data transmission. It will be noted, however, that while the terminal is in its access mode it continues to receive and process data exactly as in the previously described relay mode; thus, it is possible for a source to send data to a sink located at the same terminal. This condition also permits the previously described full duplex communication between a pair of terminals. The new data from the user ports at the terminal is delivered at the proper time through the multiplexer and priority encoder circuit 54 which transmits the data simultaneously to both channels A and B through the multiplexer circuits 58a, 58b. The appropriate preamble and sink address is added to the data from the user by circuits 60a and 60b, and the data is delivered to the bus for transmission by the T/R module 30. When the data transfer sequence is complete and all sources at the terminal have been serviced, the multiplexer circuits attach signatures to the data. At the end of the entire time slot for transmission, the bus access control signal will hold open both channels A and B for a preprogrammed additional length of time to insure that the entire transmission from that terminal is removed from the loop.

In order to permit a terminal to operate in the transmitting (or broadcasting) mode, the control words must be received from the controller terminal. If control words are not received for a given number of time frames (during which time subordinate controller terminals can assume control of the bus), the TTC selector circuit 48 will remove the bus access control signal so that the terminal cannot transmit. The terminal will continue to function in the relay mode, however, even though it is not receiving control words from an active controller. If a TTC circuit 42a or 42b then receives control words for two time frames, the TTC selector circuit will again switch the T/R modules to the transmit mode.

Finally, the terminal may be in the active control mode as shown in FIG. 8 even when it is simultaneously acting in the relay mode or in both the relay and transmitting modes previously described. In the active control mode system traffic controller (STC) logic assumes control of the TTC selector circuit 48. This circuit selects one of the TTC circuits (normally TTC 42a) to control the entire system with the counter in such circuit running free during this mode of operation while all of the counters in the other TTC circuits throughout the system are synchronized to it. During the time that the terminal is in control of the system, control words are generated in circuits 62a, 62b. These are delivered to the multiplexers 58a, 58b so that the control words are transmitted on both channels. The TTC selector circuit also provides the bus access control signal to the T/R modules during this time. Also, while in the active control mode, the decoder circuits 40a, 40b will monitor the controller identification code that is received. Normally they would receive their own identification code as the control word traverses completely around the loop. If, however, at any time they receive the identification code of a different controller, the TTC circuits will immediately relinquish control. Further logic circuitry is provided among all of the potential controller terminals so that each will assume control of the system after failure to receive control words for a predetermined number of time frames. For example, the primary controller will take over after failing to receive a control word for two time frames; the secondary controller will assume control after four time frames with no control words; the tertiary controller will assume control after six time frames with no control words, etc. In this way, control of the system by two controllers at the same time is prevented while each potential controller will have a chance to assume control of the system if required. It will be noted that since the system is synchronous data errors would not normally be expected to show up within several time frames after loss of control since the counters in the TTC circuits at the various terminals should stay in synchronism for at least such amount of time.

The specific circuitry for the TLU's 34 are shown in FIGS. 10-13 using American National Standard symbols (ANSI 32.14-1973) with polarity indicator symbols as indicated in paragraph 2.2 thereof. A bar over an output or input signal indicates that the indicated signal is low while the absence of a bar indicates that the indicated signal is high.

The specific circuitry for the information ID decoder circuit 40a is shown in FIG. 10, it being recognized that the identical circuit 40b is provided for channel B of the terminal. The synchronizing, or framing, signal, the clock signal and the data are delivered from the associated T/R module 30 as described in the aforementioned U. S. Pat. No. 4,038,494. The synchronizing signal is delivered through inverter I-4 to flip-flop FF-1 to enable gate G-1 and provide clocking pulses to a counter circuit 64. Counter 64 counts up to two to allow the 2-bit ID code to be entered into shift register 65 through inverters I-2 and I-5. Gates G-5 and G-4 are connected to the outputs of the counter 64 to indicate when the bit count is 1 and 2 respectively. At the bit count of 1, a latch 66 is cleared through gate G-4 while at the count of 2 the latch is clocked through inverter I-1. At the input to the latch 66 are four input signals from gates G-6, G-7, G-8 and G-9 which decode the output of the shift register 65 to indicate which data format is being received, i.e., control word, preamble, text or signature.

When the flip-flop FF-1 is cleared after the first two data bits, gate G-11 is disabled to remove the present signal from flip-flops FF-2 and FF-3. The ensuing data which passes through inverters I-2 and I-5 is then successively clocked through flip-flops FF-2, FF-3 and FF-4 which results in a time delay of two clock periods. It will be noted that the complement of the data, which has only passed through the inverter I-2, will be directed to a gate G-12 without passing through FF-2 so that it is not delayed. The output of flip-flop FF-4 is directed to an AND gate G-13. The signal indicating that a preamble is being received from latch 66 is anded with the delay data to enable gate G-13 while the signal from latch 66 indicating that a text word is being received is anded with the non-delayed data in gate G-12. The outputs of both gates G-12 and G-13 are directed through NOR gate G-14 to an 8-bit shift register 70. Referring back to FIG. 9, it will be noted that the format for the preamble includes only 6 bits after the ID code while the text words include 8 bits after the ID code. Thus, the 2-bit delay provided by flip-flops FF-2, FF-3 and FF-4 for the preamble data permits both data patterns to fill the register 70 from the left end thereof with the parity bit (the last bit of the pattern) being in the initial bit position in the register. The shift register 70 is clocked with a counter 72 which counts 8 clock periods. When either a text word or a preamble word creates an output signal from latch 66, exclusive OR gate G-18 and NAND gates G-19 and G-20 remove the clear signal from the counter 72 and initiate the counting. After the counter has counted to 8 (to allow the shift register 70 to be loaded in the manner aforedescribed) an output signal from the counter to gates G-15 and G-16 disables gate G-17 to simultaneously remove the clock pulses from the counter and the shift register 70.

At this time, the parity bit will be in the first position in the shift register 70, as explained hereinbefore, and a parity checking circuit 68 will, if the parity is good, enable a pair of flip-flops FF-5 and FF-6. The output of flip-flop FF-5 provides the text strobe signal (TXT STR) through gate G-22 to the demultiplexer circuitry 46a (FIG. 10A). The complimentary flip-flop FF-6 provides the preamble strobe signal (PRE STR), when a preamble word is present, which signal is directed to the last source register 50 in the TLU circuitry.

Until the next framing signal, the shift register 70 will thus contain the preamble or text word code. If it is a preamble word, the 2-bit terminal status code and the 3-bit source code are taken directly out of the register with the latter code being directed to the last source register for a purpose to be explained presently. If, on the other hand, a text word is in the shift register 70, a 6-bit sink address code is directed to PROM 72 which functions as the sink address decoder raising a signal on one or more of the addressed port lines (1A-4A) which signals are directed to the demultiplexer 46a.

The PROM 72 will not, however, receive signals if the text word is a word after the first word of a multi-word message wherein the N bit will be a "one". In that case, the sink addressees will remain the same and there will be no need to readdress the demultiplexer circuit 46a. When the text signal from latch 66 enables gate G-21, flip-flops FF-8 through FF-12 are enabled by removing the clearing signals therefrom. On the first clock period after the text word has been detected, the N bit will be directed to gate G-23. If the N bit is a "zero", flip-flop FF-11 does not get set and flip-flop FF-10 will not be toggled leaving the shift register 70 and counter 72 to operate in the manner aforedescribed. If, however, the N bit is a "1", gate G-23 is enabled to successively enable flip-flops FF-11 and FF-10 which provides an output signal to gate G-19 which will clear the counter 72 and the shift register 70 and prevent the text word from being shifted into the shift register 70. This will occur, of course, on words after the first word of a multi-word message where there is no need to readdress the data.

The delayed data DAT' is directed to a gate G-25 which is provided with an enabling signal from flip-flop FF-9 at the time when the lead bit of the data occurs at the gate. This provides an enable ($\overline{EN}$) signal to the channel selector circuit as shown and also provides an enabling signal (EN) for each of the ports in the demultiplexer circuit 46a.

If one of the ports in the demultiplexer circuit 46a is to receive a message during the subsequent data transmission, gate G-26 (FIG. 10A) and flip-flop FF-13 provide an output signal ($\overline{PA}$) to the channel selector circuit 52.

The demultiplexer circuit 46a is shown in FIG. 10A and will be seen to include NAND gates G-31 through G-38 which provide the clock and data signals (as indicated) for each of the four ports connected to the terminal. These ports are selected from the sink address decoder circuit 72 (FIG. 10) through flip-flops FF-14 through FF-17 (FIG. 10A). If a port has been addressed it must also be ready to receive data before data will be transmitted thereto; thus, NOR gates G-27 through G-30 act to lock out the flip-flops FF-14 through FF-17 if the proper request to receive signal ($\overline{RR}$) is not received from the connected user port, or, if a signature, control word or preamble is detected so as to enable gate G-24.

Specific circuitry for the terminal traffic controller 42a is shown in FIG. 11, and it will be appreciated that circuitry 42b will be identical thereto. As hereinbefore indicated, the terminal traffic controller performs the function of monitoring the control words received by the associated T/R module 30 at the terminal to keep the terminal in synchronism with the system controller and to initiate transmission from the terminal at the appropriate times. At the end of the initial framing signal and ID code of a control word, a control word signal ($\overline{CON}$) is raised by the latch 66 in the information ID decoder circuit 40a as previously pointed out, and such control signal will disable gate G-42 (FIG. 11) and remove the clearing signal from a counter 80 and a shift register 82. The counter 80 is connected to the associated T/R clock and is thus activated to count to 9 to allow the last 9 bits of the control word (controller code, time frame code and parity bits) to be shifted into the also activated shift register 82. At the count of 9 the gate G-41 is enabled to disable gate G-40 and remove the clock signal from counter 80 and shift register 82 to thereby disable these circuits. The four parity bits of the control word are then looked at by the parity checking circuit 84, which is a conventional Hamming code 4-bit parity checking circuit, and circuit 84 provides an enabling signal to gate G-43 if the parity is good. Flip-flops FF-20, FF-21 and FF-22 are connected in series to the output of the counter 80 through gate G-41 and serve to create a 1-½ clock period delay following the shifting of the control word into shift register 82 in order to allow time for the parity checking circuitry 84 to perform its operation. The output of such delay circuit from flip-flop FF-22 and the parity signal cause gate G-43 to provide a load signal ($\overline{LOAD}$) to counters 88 and 90. The counter 88 is the counter previously referred to which is associated with each TTC circuit and which counts from 0 to 671 (672 counts) between control words and thereby defines the time frames for the data transmission. Since not all time frames need have similar terminal transmitting formats, the counter 90 is used to count the time frames in a full transmission sequence. In the present example, the counter 90 is set to count to four before being recycled, i.e., there will be four distinct time frames within one complete transmission sequence.

As explained previously, since a given terminal may be located at a distance from the controller terminal so that several clock periods pass before the control word generated at the controller terminal is received by the TTC circuit 42a as shown in FIG. 11, the counter 88 will be automatically loaded with a count equivalent to that delay when the control word is received. Since there are only two potential controller terminals (1 and 3) in the present example, this count is provided by one of two presetable switch arrays 96a or 96b with array 96a defining the propagation delay from the primary controller (terminal 1) while array 96b defines the propagation delay from the secondary controller (terminal 3). Upon the reception of the load signal from the gate G-43 through gate G-43a, the counter 88 thus starts to count from the number which is loaded in from the appropriate switch array 96a or 96b through the multiplexer circuit 86 with the selection being made by the decoded control code bit "C" from the shift register 82 as shown.

The three-bit time frame code in the register 82 is loaded into the counter 90 upon the reception of the load ($\overline{LOAD}$) signal. Thus the time frame counter 90 is also kept in synchronization with the system controller with each received control word.

The count in counter 88 will be continuously monitored by the preprogrammed PROM 92 which will also monitor the frame count from counter 90. If the terminal with which TTC circuit 42a is associated is to transmit at a particular band count (i.e., a particular subdivision defining a time slot) within a particular time frame, an output signal is provided on the transmit terminal line (XMT TERM) and signals are provided on the "poll port" lines (PP1 through PP4) to determine whether or not the particular user source is ready to transmit data. If the terminal with which the TTC circuit of FIG. 11 is associated is a controller terminal, either primary or secondary, a signal will also be provided on the transmitter control line (XMT CON) from PROM 92 when it is time to broadcast the control words to initiate a new time frame.

It will be noted that the frame counter 90 is also connected to the clock input of another counter 94. The counter 94 is capable of counting to 8 with the count of 2 providing an output signal through flip-flop FF-24 (MC=2), the count of 4 providing an output signal through flip-flop FF-25 (MC=4), and the count of 8 providing a disable signal ($\overline{DIS}$) through gate G-46. The counter 94 is normally cleared out by a clearing signal from gate G-45 which will be enabled each time a $\overline{LOAD}$ pulse (i.e., a control word) occurs, or if the associated TTC circuit is controlling the bus. If neither of these two conditions are occurring then it signifies that no control words are being received from the bus, and the counter 94 will count one count for each missed control word with its input being derived from the output of the main counter 88 through counter 90. If the terminal which includes the circuitry of FIG. 11 is the primary controller, then the missed count signal (MC=2) from flip-flop FF-24 will cause the terminal to assume control of the bus after two missed control words. If the terminal is a secondary controller, then the missed count signal (MC=4) from flip-flop FF-25 will cause the terminal to assume control of the bus after four missed control words, the signal from FF-25 occurring 2 time frames after the signal from FF-24. If no control words are received for a full 8 time frames, then gate G-46 provides a disable signal ($\overline{DIS}$) to the TTC selector circuit 48 and simultaneously disables the PROM 92 so that the TTC circuit will no longer be able to provide bus access control for the terminal.

It will also be noted that the controller identification bit (the first bit of the 2-bit control code in the shift register 82) is monitored by an exclusive-OR gate G-44. If the terminal which includes the TTC circuitry of FIG. 11 is in control of the bus then the signal on the enable control transmitter line ($\overline{EN\ CON\ XMT}$) is low and flip-flop FF-23 will be enabled. By setting the alternate input to the exclusive-OR gate G-44 in accordance with the indicated conditions in FIG. 11, when the TTC circuitry of FIG. 11 is in control of the bus the flip-flop FF-23 will provide a low output only if an alternate controller is providing control words. This low output signal ($\overline{C\text{-}ALT}$) is directed to the system traffic controller (STC) circuit in circuitry 48 (FIG. 13) and acts to relinquish control from the terminal so that two controllers will not be attempting to control the bus at the same time.

It will be noted that the enable control transmitter ($\overline{EN\ CON\ XMT}$) signal also acts through gate G-43a to disable the load signals to the counters 88 and 90 when the associated terminal is in control of the system to thereby let the counters 88 and 90 run free during this time.

The last source register 50 and the channel selector circuit 52 are shown in FIG. 12 of the drawings. In the last source register, latch circuits 100 and 102 receive the source code signals from the detected preamble word in the information ID decoders 40a and 40b, respectively. These signals are latched in by the preamble strobe (PRE STR) signals from the decoder circuits as previously described. A comparator 104 compares the outputs of the latch circuits 100 and 102 and provides a high output signal when the latch outputs are equal to each other and a low output signal when the latch outputs are not equal. Thus, assuming that the latches are cleared to start with, the output signal will be low since gate G-49 will prevent the comparator from indicating that the latch outputs are equal. The first channel (A or B) at the terminal which receives a new preamble will direct the new source code signal to the appropriate latch 100 or 102. The comparator 104 will now be enabled by gate G-49, but the output of the comparator 104 will stay low, indicating an inequality. As the preamble signal (PRE) for that channel is removed upon the reception of the framing bit for the following text word, AND gate G-51 will be enabled through flip-flop FF-31 or flip-flop FF-33 to pre-set flip-flops FF-35, FF-36, FF-38 and FF-39 through gates G-53, G-54, G-56 and G-57, respectively. The toggled flip-flop FF-31 or FF-33 is reset when the preamble strobe signal (PRE STR) is removed (It will be noted that the preamble strobe signal is removed one-half clock period after the associated preamble signal is removed). This reset removes the presetting signal from flip-flops FF-35, FF-36, FF-38, and FF-39 through the aforementioned gates. When the second channel (B or A) at the terminal provides the same preamble to the associated latch 102 or 100, respectively, the comparator 104 will detect the equality and the output therefrom will be high, enabling flip-flops FF-30 and FF-32 and disabling flip-flops FF-31 and FF-33. As the preamble signal (PRE) for that channel is removed, FF-30 or FF-32 provides a clearing signal ($\overline{CLR}$) through gate G-50 to clear latches 100 and 102. The output of the comparator 104 will go low and preset flip-flops FF-30 and FF-32 to prepare the circuit for the next preamble. The purpose of the last source register circuit is therefore to detect when a new source of data is transmitting and to permit the first channel receiving said data from that source to control the flow of such data to the user ports through the channel selector circuit 52.

When the flip-flops FF-35, FF-36, FF-38 and FF-39 in the channel selector circuit 52 are pre-set by the output signal from the last source register 50, indicating that a new source is transmitting, the detected lead bit signal on the enable line ($\overline{EN}$) from the channel with the data and the accompanying port addressed signal ($\overline{PA}$), indicating that one of the user ports of the terminal is to receive data, serve to clock one of the pairs of flip-flops FF-35 and FF-36 or FF-38 and FF-39. The output signals from FF-36 and FF-39 are connected to the clear and pre-set ports of a flip-flop FF-40 (as shown) so that the first signal received from either channel will provide an output select signal while at the same time inhibiting the other channel. The output signal from the flip-flop FF-40 causes the multiplexing circuit 106 to select the appropriate channel A or B from which all of the signals to the user ports are directed.

The TTC selector and STC logic circuitry 48 is shown in FIG. 13. The terminal transmit (XMT TML) and poll port (PP) signals from the two TTC PROMs 92 (FIG. 11) are directed to a multiplexer 110 which sends a signal to OR gate G-60 when the terminal is to transmit, i.e., broadcast, the gate G-60 providing the bus access control signal which operates the switches 31 in the T/R modules 30 as previuusly described. The multiplexer 110 selects the inputs from either channel A or channel B in accordance with the output signal from a flip-flop FF-50. When the circuitry is activated the flip-flop FF-50 will select either channel A or channel B at random assuming that neither channel has been disabled. The multiplexer will then continue to output signals from that randomly selected channel until it is disabled whereby it will immediately switch over to the other channel. The poll port signals PP1 through PP4 which are output from the multiplexer 110 will be selectively raised (by the PROM 92 in the TTC circuitry, as previously explained) in accordance with the number of user sources which may transmit during the terminals defined time slot for broadcasting. The raised poll port lines clock flip-flops FF-52 to FF 55 to provide enable transmit signals $\overline{ET-1}$ to $\overline{ET-4}$ which are directed to the user sources. If the user sources are ready to transmit they will respond with request to transmit ($\overline{RT}$) signals which are respectively directed to NAND gates G-65 to G-68 as shown. The gates G-65 through G-68 are disabled by the request to transmit ($\overline{RT}$) signals from the user ports unless such signals arrive after a lock out signal is provided (in a manner to be explained presently) which signal will occur at the end of the preamble immediately preceding the terminal transmission text words. The output from the gates G-65 to G-68 provide preset signals to the flip-flops FF-52 to FF-55 respectively so as to remove the enable transmit ($\overline{ET}$) signals therefrom. Thus, no user source will be permitted to transmit during a given time slot unless the request to transmit ($\overline{RT}$ signal is received prior to the raised lock out signal. Also, after each user source is through with its transmission, it will remove its request to transmit signal which has the effect of enabling the associated gate G-65 to G-68 to preset the associated flip-flop FF-52 to FF-55 to thereby remove the enable transmit signal from that source. The flip-flops FF-52 to FF-55 can only be clocked once as the poll port lines PP1-PP4 are raised; thus, a user source cannot retransmit during the same time slot. The order in which the multiple user sources transmit during the given time slot is determined by the priority encoder in the circuitry 54 (FIG. 14) as will be explained presently. If desired, the PROM 92 in the TTC circuitry may be programmed to selectively and sequentially remove the poll port signals during the broadcast time slot in order to permit each of the user sources to have its chance to transmit; in order to accomplish this, circuitry (not shown) may be connected between the poll port lines and the preset lines of the flip-flops FF-52 to FF-55 to remove the enable transmit signals upon a change of state of the associated poll port signal.

The STC logic circuitry is also shown in FIG. 13 as forming a portion of the TTC controller circuitry 48. When the transmit control signal (XMT CON) is raised by PROM 92 in the controlling TTC circuit 40a, the terminal transmit signal ($\overline{\text{TERM XMT}}$) is provided through enabled gates G-83 and G-60. Control will be relinquished, as previously explained, when the controlling terminal receives control words from another terminal. Thus, gate G-80 receives the alternate controller ($\overline{\text{C-ALT}}$) signals from both channels of the terminal to clear flip-flop FF-60 and remove the enable control transmit signal. It will be noted that gate G-80 also receives a disabling input in any terminal which is not a potential controller terminal so that the enable control transmit signal can never be raised. Finally, the control signal can be raised when the flip-flop is preset through the gate G-81. This occurs when the missed count (MC) signal is either 2 or 4 (depending on whether the terminal is a primary or secondary controller) and the alternate (i.e., non-controlling) channel has also missed the same counts from the time frame counters.

The multiplexer and priority encoder circuitry 54 is shown in detail in FIG. 14. As shown, the enable transmit signals $\overline{ET1}$-$\overline{ET4}$ from the TTC selector circuitry 48 are latched by a latch circuit 124 and presented to a priority encoder chip 122 which, in accordance with a predetermined order of priority, selects from among the enable transmit signals the one with the highest priority and provides a two-bit output signal on lines A1 and AO, indicating the selected user source. Also, the priority encoder circuit provides a coded output on lines GS and EO indicating that one or more of the enable transmit lines have a signal on them, the lines GS and EO subsequently being used as the two-bit text word ID code. In the absence of any signals on the enable transmit lines, the signals on the lines GS and EO are reversed to thus provide the two-bit signature ID code. The output signal on lines A1 and AO from the priority encoder chip (indicating the selected user source) are provided to a multiplexer 120, to a multiplexer 116, to a multiplexer 118, to a de-multiplexer 114, and to the sink address prom in the sink address generator circuitry (FIG. 17). Multiplexer 120 performs a monitoring function, monitoring the enable transmit signal ($\overline{ET}$) of the selected user source and providing an output signal (ET MON) when the enable transmit signal is lost after the selected user source has finished its transmission and removed its request to transmit signal (RT) in the manner previously explained.

The multiplexers 116 and 118 serve as the input multiplexers for the data (DTI-DT4) and the clock (CI1--CI4), respectively, from the user sources at the terminal and provide the data (DIO) and clock (CIO) outputs to the multiplexer circuits 58a, 58b. In order to initiate the transmission of data from the selected user source, a send clock (SND CLK) signal is generated in the transmission control logic circuitry (FIG. 18) which enables the de-multiplexer circuit 114 and permits this circuit to transfer a system clock SC to the selected user source as determined from the signals from the priority encoder 122. The system clock (SC) is a free running oscillator in the transmission control logic circuitry (FIG. 18) which serves as the controlling clock for all of the transmission control logic and for the transmission of data from the user source to the associated T/R modules. Once the user source receives the clock SC from the de-multiplexer circuit 114 it immediately sends its data and clock signals over one of the lines DT1-DT4 and CI1-CI4, which are multiplexed through the multiplexer chips 116 and 118. The user source clock (CI1--CI4) will, of course, be the same as the transmitted clock (CT1-CT4) with the user source data being synchronized therewith.

It will also be noted that the send clock (SND CLK) signal is provided to a NOR gate G-62 which is also provided with an input from the user source clock signal (CIO). The output of gate G-62, upon the initial reception of the SND CLK signal, removes a clear pulse from a counter 112 and permits the counter to start counting upon subsequent pulses from the system clock SC. If the counter counts to 2 prior to being cleared (by continuing CIO pulses), a signal will be generated over counter output line $\overline{TF2}$ which indicates to the transmission control logic circuitry that another frame is to be generated, such signal being used in multi-word messages where the clock signal from the user source will be deliberately stopped for a period of time of two clock counts or more. It will be noted that no signal on line $\overline{TF2}$ will be provided so long as the clock signal CIO is received from the user within one clock period since the gate G-62 will therefore be continuously enabled to clear the counter 112.

The logic circuitry for controlling transmission, (i.e., broadcasting) from a terminal is shown in FIG. 18. As stated hereinbefore, a system clock 132 is provided which provides system clock signals SC and its complement $\overline{SC}$ at 10 megahertz through a flip-flop circuit FF-74. This system clock controls the operation of all of the components in the transmission control logic circuitry. As indicated in FIG. 18, the terminal transmit ($\overline{\text{TERM XMT}}$) signal received from the TTC selector circuitry 48 (FIG. 13) removes a clear signal from a shift register 134 and allows subsequent clock pulses from the system clock SC to shift a framing signal through the shift register. The framing signal is initiated by the inputs from one of the two lines XC or XT which are raised at the same time that the terminal transmit line ($\overline{\text{TERM XMT}}$) goes low and which originate in the PROM 92 in the TTC circuitry (FIG. 11) indicating that the terminal is to transmit data (XT) or to transmit a control word (XC). If the line XC is raised (indicating that the terminal is to transmit a control word) flip-flop FF-68 is clocked to enable AND gate G-73 to cause the Q1 output of the shift register 134 to be raised upon the reception of the next subsequent clock pulse SC. The Q1 output is directed through an inverter to the preset input of the flip-flop FF-68 so that upon the subsequent clock pulse Q1 will go low and will remain low thereafter to prevent the generation of further control words until a new signal XC is generated. The framing pulse in the shift register 134 is then shifted through the register on subsequent clock (SC) pulses. On the third clock pulse output line $\overline{Q3}$ goes low and serves to load the control word generator (FIG. 16) with the appropriately coded control word data. On the fourth clock pulse, the $\overline{Q4}$ output of shift register 134 transmits the framing pulse to the associated T/R modules to initiate the transmission of the control word.

When the transmit terminal (XT) signal is raised, a flip-flop FF-69 is clocked to enable the gate G-73 to, in the manner previously described, also create a framing pulse in the shift register 134 which is subsequently shifted therethrough. Once the framing pulse is created at the output Q1 of the shift register, the flip-flop FF-69 is preset in the same manner as the flip-flop FF-68 was preset after the initial transmit signal. On the third shift through the register 134, output $\overline{Q3}$ provides a signal to the preamble and sink address generator circuitry 60a, 60b (FIG. 17) which causes the coded sink address and preamble to be loaded into their respective registers. On the fourth clock pulse output $\overline{Q4}$ of the shift register 134 sends the framing signal to the associate T/R modules as previously explained.

Also, the initial raising of a signal at the Q1 output of the shift register 134 provides the clock input signal to the latch 124 in the priority encoder circuitry (FIG. 14) so that the enable transmit ($\overline{\text{ET}}$) signals are latched into the priority encoder chip 122 as previously explained. On the fourth shift of a framing pulse through the register 134, a flip-flop FF-73 is clocked to remove the clear input from a counter 136, thereby allowing this counter to begin counting. The counter 136 will count up to 8 at which time the $Q_D$ output will go high thereby enabling a gate G-77 which, in turn, enables gate G-75 to clock a flip-flop FF-72. On the subsequent falling edge of a clock pulse SC, the $\overline{Q}$ output of flip-flop FF-75 goes high to create the aforementioned lockout signal and the gate G-77 is simultaneously disabled by the Q output of flip-flop FF-75. On the subsequent rising edge of the clock pulse SC, flip-flop FF-70 is clocked to enable gate G-73 and initiate the transfer of a new framing pulse for the text words through the shift register 134. The $\overline{Q}$ output of flip-flop FF-70 also serves to preset flip-flop FF-72 to prevent gate G-73 from subsequently being enabled. During the time period prior to the initiation of the lockout signal, the preamble is loaded into the preamble shift register (FIG. 17) and transmitted directly after the transmission of the framing pulse to the associated T/R modules. The transmission of text words, which as previously explained is initiated by the transmission of the SND CLK signal to the user sources (FIG. 14), is prevented by the absence of the lockout signal which disables gates G-82 and G-84.

As previously mentioned, upon the generation of a control word, a new framing pulse for text words ($\overline{\text{T-FRM}}$) is generated in the shift register 134 from FF-70, which framing pulse is subsequently shifted through the shift register in the manner previously explained. The generation of this framing pulse at the Q1 output of the register presets the flip-flop FF-73 through a gate G-74 to clear the counter 136. Subsequently, on the fourth clock pulse through the shift register 134, flip-flop FF-73 is clocked to remove the clear from counter 136 and permit the counter to again start its count. Since the gates G-82 and G-84 are enabled upon the generation of the lockout signal following the creation of the preamble, upon the count of 10 in counter 136 the gate G-84 will be enabled to provide a high input to a flip-flop FF-77 through gate G-85. This enables gate G-74 to preset the flip-flop FF-73, which again clears the counter 136. On the subsequent half-clock cycle, flip-flop FF-78 is clocked to initiate the SND CLK signal to the output multiplexer circuitry 54 (FIG. 14) to initiate the transmission of data from the user source. The $\overline{Q}$ output of flip-flop FF-78 also enables a gate G-76 so that upon the reception of a signal on the ET MON line from the priority encoder circuitry (FIG. 14), indicating that the user source has finished its transmission, the gate G-75 will be enabled to initiate the transmission of a new framing pulse for the text word of the second user source to transmit from the said terminal during a given time frame.

In the event that a multi-word message is to be transmitted by a single user source, the signal $\overline{\text{TF2}}$ will be generated in the output multiplexer circuitry 54 (FIG. 14) in the manner previously described. This signal also serves to enable gate G-75 (FIG. 18) to initiate a framing pulse in the shift register 134. The $\overline{\text{TF2}}$ signal also clocks a flip-flop FF-76 to reverse the output state thereof and thereby enable gate G-72 while at the same time disabling alternate gate G-84. Thus, rather than permitting ten counts from the counter 136, the gate G-82 will be enabled after three counts in the counter 136, before a new SND CLK signal can be sent to the user source. It will be noted from FIG. 9 that the 10 counts are required in the initial text word (after the framing bits) so as to include room for the sink address information whereas the text words after the first word require only a three bit code (after the framing bits). The output of flip-flop FF-76 also provides a signal $\overline{\text{N0}}$ which is provided to the shift register for the preamble generator (FIG. 17) to provide the end bit in the text word format as previously explained with respect to FIG. 9. An AND gate G-86 is provided to preset flip-flops FF-77 and FF-78 so as to remove the SND CLK signal between words, the gate G-86 being enabled by the ET MON signal (indicating that a user source has finished its transmission), the $\overline{\text{TF2}}$ signal (indicating a break between words in a multi-word message), and the zero signal (EO) from the priority encoder chip 122 (indicating that no further user sources are to transmit during the given time slot). This last condition corresponds to the generation of the signature at the end of transmission.

One of the output multiplexer circuits 58a, 58b is shown in FIG. 15, it being understood that both of said circuits are identical and both receive the identical signals from the multiplexer and priority encoder circuitry 54 (FIG. 14). The data signal DIO from the user source is provided at the input of a flip-flop FF-66 while the clock signal CIO is directed to a gate G-72 to enable this gate to clear a flip-flop FF-65 until the gate is shortly thereafter disabled by the output of one-shot circuit 130. This clear signal from G-72 provides a "one" in the flip-flop FF-65 which serves as the lead bit in the data transmission pattern, it being recognized that the first bit of the data will be at the upstream flip-flop FF-66 when FF-65 is cleared. The data, including the lead bit, is then clocked through FF-65 and through a flip-flop FF-64 by the system clock (SC) signal from the transmission control logic circuitry (FIG. 18). The data is directed out to the associated TR module through a multiplexer 128 which is controlled by the send clock $\overline{SND}$ $\overline{CLK}$ signal from the transmission control logic circuitry. When the send clock signal is low, data from the user source is directed through the multiplexer from input A whereas at other times control words, text words, preambles and signatures will be directed therethrough from input B. A second multiplexer circuit 126 is provided to determine whether control word, sink address, or preamble is to be output to the multiplexer circuit 128. This is determined by logic circuitry (G-70, G-71 and FF-63) which receives the previously described lockout signal, the $\overline{Q3}$ signal from shift register 134 (FIG. 18), and the transmit terminal (XT) signal. When a control word is being transmitted, the XT signal will be low whereby high outputs will be present on both gates G-70 and G-71 to permit the control word to be directed through the multiplexer 126. When the XT signal is high, (indicating the transmission of preamble or text words) the multiplexer 126 setting will be determined by the condition of the lockout signal. During the transmission of the preamble, the lockout signal will be low whereby the output of gate G-70 will be high and the output of gate G-71 will be low. When the lockout signal comes high to initiate the transmission of text words, output from G-70 will be low and the output of gate G-71 will be high to thereby switch the input of the multiplexer 126 to receive the sink address information. The input logic circuitry for multiplexer 126 as aforedescribed is set up upon the reception of the $\overline{Q3}$ pulse from the shift register 134 through the flip-flop FF-63, just before the transmission of the framing pulse to the associated T/R module. Finally, it will be noted that a flip-flop FF-62 is provided between the multiplexer circuit 126 and the multiplexer 128 so as to realign the data with the system clock SC in the event that there is a data lag through the multiplexer circuit 126.

One of the control word generator circuits 62a, 62b is shown in FIG. 16. Basically, the control word generator comprises a serial shift register 140 which is parallel loaded on inputs A through L to provide the eleven bit control word (following the framing bits) as previously described with respect to FIG. 9. The initial two ID bits are provided by grounding the L and K inputs to provide the "OO" ID signal to indicate a control word. The two-bit controller identification code is then provided by means of setable controller switches indicated generally at 144 and provided to the H and J inputs of the shift register 140. The three-bit time frame identification is generated by the counter 90 in the associated TTC circuitry (FIG. 11) as previously described and is provided on the E, F and G inputs of the shift register. Finally, the four-bit parity code (provided on the A-D inputs of the shift register) is provided by a Hamming code parity generator 142 which monitors the five time frame and controller code inputs. The shift register 140 is parallel loaded upon the reception of the $\overline{Q3}$ signal from the shift register 134 in the transmit control logic circuitry as previously described so that upon the subsequent pulse from the system clock SC the control word will be serially shifted out to follow the framing bits to the associated T/R module.

The preamble and sink address circuitry 60a, 60b is shown in FIG. 17 of the drawings. The preamble generator basically comprises a parallel loaded serial shift register 148 which is parallel loaded through inputs A to H. The two-bit ID code is provided by grounding inputs H and G as shown, it being recognized that the output is inverted to thereby provide the "11" identification code indicating a preamble word. Status signals from the associated T/R modules for both the A and B channels are anded through gates G-92 and G-93 to provide the two-bit terminal status code as shown. The three-bit source code signal is then provided by means of a bank of source switches 156, and the parity bit is provided by a conventional parity generator which monitors the five proceeding bits in the preamble word. As with the control word, the preamble word is parallel shifted into the register 148 upon the reception of the signal from the register 134 so that the subsequent clock pulse SC will shift the preamble out to follow the framing bits to the associated T/R module.

Finally, the sink address generator (FIG. 17) basically comprises a parallel loaded serial shift register 146 whereby the text word ID code is provided by the GS and EO outputs of the priority encoder chip 122 (FIG. 14). It will be noted that when these signals are reversed to indicate the end of transmission from the terminal, the signature ID code is provided out of shift register 146. The N bit is generated at input register 146 to indicate a multi-text word or the first word of the text, said N bit being generated from the flip-flop FF-76 (FIG. 18) which, in turn, is activated by the $\overline{TF2}$ signal from the priority encoder and output multiplexer circuitry 54 (FIG. 14) as previously explained. The six-bit sink address identification code is generated in a prom 150 in accordance with the inputs A0 and A1 received from the priority encoder circuit 122. Finally, a conventional parity generator monitors the six-bit sink address and provides a parity bit at the A input of the shift register 146. As with the registers 140 and 148, the text words (or signature) are serially shifted out of the shift register 146 upon the reception of the $\overline{Q3}$ signal from the register 134 of the transmit control logic circuitry (FIG. 18).

Although the best mode contemplated for carrying out the present invention has been herein shown and described, it will be apparent that modification and variation may be made without departing from what is regarded to be the subject matter of the invention.

What is claimed is:

1. A data bus system comprising a plurality of terminals interconnected in a continuous chain for distributing serial digital data in a format which includes a continuous series of time frames of a predetermined length sufficient to include time for the initiation of data by one or more of said terminals, each time frame being preceded by a control word which is produced by a system controller terminal which defines the start of the time frame and identifies the terminal producing said control word, each terminal including means for receiving said data and control work from one terminal and retransmitting them to another terminal in the chain, a plurality of said terminals comprising broadcast terminals capable of intitiating said data within any of said time frames, means for permitting each broadcast terminal to determine according to predetermined time measured from reception of a control work when it may initiate data within any given time frame without interfering with data initiated by others of said broadcast terminals within said time frame, said terminals including a plurality of controller terminals each of which is selectively capable of supplying said control words, and logic means at each of said controller terminals for detecting the absence of received control words and for deciding according to predetermined criteria whether or not the controller terminal shall thereupon itself produce control words for defining the start of said time frames.

2. A data bus system according to claim 1 wherein said continuous chain comprises a closed loop.

3. A data bus system according to claim 2 wherein said continuous chain comprises a pair of complementary closed loops, each broadcast terminal including means for simultaneously transmitting data over each of said loops with the data moving in opposite directions from the broadcast terminal.

4. A data bus system according to claim 3 wherein each terminal is connected to one or more data sinks and includes logic circuitry for monitoring both of said loops and for transferring data only from the loop from which it is received first to the data sinks connected to the terminal.

5. A data bus system according to claim 4 wherein said logic circuitry further includes means for continuously determining whether data from a new source is being received on either of said loops in order to make the determination as to which loop is providing data at the earliest time.

6. A data bus system according to claim 1 wherein said logic means for deciding whether or not a controller terminal shall produce control words includes a counter, means at each controller terminal for relinquishing the generation of control words if control words are received from another terminal, and means at each control terminal for initiating the generation of control words after a predetermined number of counts on said counter without the reception of a control word, the counter of each of the controller terminals being set to count to a different number from that of the other controller terminals prior to the initiation of the generation of control words.

7. A data bus system according to claim 1 wherein said control word contains a variable frame number and wherein said means for permitting each broadcast terminal to determine when it may initiate data within a time frame includes means for permitting initiation only during frames identified by particular predetermined frame numbers.

8. A data bus system according to claim 1 wherein means are provided at each broadcast terminal for preventing the initiation of data if no control words are received for a period corresponding to a predetermined number of consecutive time frames.

9. A data bus system according to claim 1 wherein each broadcast terminal includes means responsive to said control word for addressing the data to particular data sinks at particular terminals and wherein each terminal includes means coupled to said means for receiving for monitoring all data on the bus system to determine whether or not the data is to be directed to a particular data sink at said terminal.

10. A data bus system comprising a plurality of terminals servicing a plurality of users, said plurality of terminals being interconnected in a continuous chain, means in each of said terminals for distributing serial digital data originating at ones of said terminals to all others of said terminals in a format which includes a continuous series of time frames of a predetermined length sufficient to include time for the transmission of data, each time frame being preceded by a control word including a synchronizing signal, which control word defines the start of the time frame and which is provided by only one of said terminals designated the controller terminal, each terminal including means for receiving said data and said control word from one terminal and retransmitting them to another terminal in the chain, means at ones of said terminals for diverting said data to addressed ones of said users coupled thereto, a plurality of said terminals comprising broadcast terminals capable of initiating said data within said time frames, each broadcast terminal and the controller terminal including a counter, means for synchronizing the counter of each broadcast terminal with the counter of said controller terminal, and means at each broadcast terminal coupled to said means for synchronizing for determining when it may initiate a transmission of data within a time frame based on the count appearing on the associated counter.

11. A data bus system according to claim 10 wherein said continuous chain comprises a closed loop.

12. A data bus system according to claim 11 wherein said continuous chain comprises a pair of complementary closed loops, each broadcast terminal including means for simultaneously transmitting data over each of said loops with the data moving in opposite directions from the broadcast terminal.

13. A data bus system according to claim 10 wherein said controller terminal is a primary controller terminal and wherein one or more of others of said terminals comprise potential controller terminals wherein they may assume the functions of said primary controller terminal in the event that the primary controller terminal is not functioning, and means at each potential controller terminal for determining whether or not said potential controller terminal shall generate the control words to define the time frames.

14. A data bus system according to claim 13 wherein each control word includes an identification of the controller terminal which generated the control word, said means for synchronizing the counter of each broadcast terminal including means for resynchronizing the counter when a new controller terminal is present as determined by the controller terminal identification in the control word.

15. A data bus system according to claim 10 wherein said means for synchronizing the counter of each braodcast terminal includes means for providing a predetermined number of counts based on propagation time from said controller terminal and means for adding said predetermined number of counts to the counter.

16. A data bus system according to claim 10 wherein said control word contains a variable frame number and wherein said means at each broadcast terminal for determining when it may initiate a transmission includes means for inhibiting said initiation during frames identified by certain predetermined frame numbers.

* * * * *